(12) United States Patent
Yan

(10) Patent No.: US 12,375,591 B2
(45) Date of Patent: Jul. 29, 2025

(54) ELECTRONIC DEVICE WITH FOLDABLE SCREEN AND CONTROL METHOD

(71) Applicant: Honor Device Co., Ltd., Shenzhen (CN)

(72) Inventor: Bin Yan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 153 days.

(21) Appl. No.: 17/758,543

(22) PCT Filed: Jan. 20, 2022

(86) PCT No.: PCT/CN2022/072959
§ 371 (c)(1),
(2) Date: Sep. 9, 2022

(87) PCT Pub. No.: WO2022/183864
PCT Pub. Date: Sep. 9, 2022

(65) Prior Publication Data
US 2024/0187506 A1 Jun. 6, 2024

(30) Foreign Application Priority Data

Mar. 5, 2021 (CN) .......................... 202110245285.5
May 20, 2021 (CN) .......................... 202110552769.4

(51) Int. Cl.
*H04M 1/02* (2006.01)
*G06F 1/16* (2006.01)

(52) U.S. Cl.
CPC ........ *H04M 1/0214* (2013.01); *G06F 1/1677* (2013.01); *H04M 1/0243* (2013.01);
(Continued)

(58) Field of Classification Search
CPC ............. H04M 1/0214; H04M 1/0243; H04M 1/0245; H04M 1/0264; H04M 1/0266;
(Continued)

(56) References Cited

U.S. PATENT DOCUMENTS 8,102,488 B2   1/2012  Choi
10,254,863 B2  4/2019  Shin et al.
(Continued)

FOREIGN PATENT DOCUMENTS

CN   101526708 A   9/2009
CN   104375310 A   2/2015
(Continued)

*Primary Examiner* — Lewis G West
(74) *Attorney, Agent, or Firm* — Slater Matsil, LLP

(57) ABSTRACT

An electronic device includes the foldable screen and a controller. The foldable screen includes a light-transmitting cover plate and a display panel that are stacked. The display panel includes a display region and a non-display region surrounded by the display region, and a light-shielding layer is arranged between the light-transmitting cover plate and the display panel. The foldable screen is foldable between a first state and a second state. When the foldable screen is in the first state, an orthographic projection of the light-shielding layer on the display panel overlaps with the non-display region and does not overlap with the display region. When the foldable screen is in the second state, the controller is configured to control a first part in the display region adjacent to and surrounding the non-display region to be in a black screen state.

20 Claims, 16 Drawing Sheets

(52) U.S. Cl.
CPC ....... *H04M 1/0245* (2013.01); *H04M 1/0264* (2013.01); *H04M 1/0266* (2013.01)

(58) Field of Classification Search
CPC .... G06F 1/1677; G06F 1/1637; G06F 1/1641; G06F 1/1652; G06F 1/1686; G09G 2310/0232; G09G 3/035; G09F 9/301
See application file for complete search history.

(56) References Cited

U.S. PATENT DOCUMENTS

| | | | |
|---|---|---|---|
| 11,309,363 B2 | 4/2022 | Zhao | |
| 11,374,206 B2 | 6/2022 | Yu et al. | |
| 11,404,676 B2* | 8/2022 | Li | H04M 1/0266 |
| 11,469,404 B2* | 10/2022 | Li | H10K 59/124 |
| 12,112,670 B2* | 10/2024 | Shin | G06F 1/1616 |
| 2002/0186192 A1* | 12/2002 | Maruoka | G09G 3/3614 345/87 |
| 2016/0282664 A1 | 9/2016 | Wu | |
| 2020/0092997 A1* | 3/2020 | Song | H10K 59/8791 |
| 2020/0280006 A1* | 9/2020 | Sun | G06F 1/3218 |
| 2020/0333835 A1 | 10/2020 | Wi et al. | |
| 2020/0363928 A1 | 11/2020 | Lin et al. | |
| 2021/0333661 A1* | 10/2021 | Zhao | G02F 1/133512 |
| 2021/0405440 A1* | 12/2021 | Yu | H04M 1/0266 |
| 2022/0026762 A1 | 1/2022 | Ma et al. | |
| 2022/0026771 A1 | 1/2022 | Yan et al. | |
| 2022/0037442 A1 | 2/2022 | Liu et al. | |
| 2022/0191313 A1* | 6/2022 | Pan | H04M 1/72403 |
| 2022/0283684 A1 | 9/2022 | Zhang | |
| 2022/0308638 A1* | 9/2022 | Peng | G06F 1/1656 |
| 2023/0041381 A1* | 2/2023 | Silvanto | G06F 1/1688 |
| 2024/0036408 A1* | 2/2024 | Chi | G02F 1/133512 |
| 2024/0063192 A1* | 2/2024 | Peng | H10H 20/857 |

FOREIGN PATENT DOCUMENTS

| | | |
|---|---|---|
| CN | 105208149 A | 12/2015 |
| CN | 105718134 A | 6/2016 |
| CN | 107589836 A | 1/2018 |
| CN | 107861299 A | 3/2018 |
| CN | 108181750 A | 6/2018 |
| CN | 108319390 A | 7/2018 |
| CN | 108681131 A | 10/2018 |
| CN | 108881528 A | 11/2018 |
| CN | 108983469 A | 12/2018 |
| CN | 109541833 A | 3/2019 |
| CN | 109597236 A | 4/2019 |
| CN | 110045936 A | 7/2019 |
| CN | 110166679 A | 8/2019 |
| CN | 110286972 A | 9/2019 |
| CN | 110381201 A | 10/2019 |
| CN | 110444581 A | 11/2019 |
| CN | 110491910 A | 11/2019 |
| CN | 110634410 A | 12/2019 |
| CN | 110839096 A | 2/2020 |
| CN | 111124561 A | 5/2020 |
| CN | 111161643 A | 5/2020 |
| CN | 111190563 A | 5/2020 |
| CN | 111199999 A | 5/2020 |
| CN | 111475077 A | 7/2020 |
| CN | 111740030 A | 10/2020 |
| CN | 112002239 A | 11/2020 |
| CN | 112086025 A | 12/2020 |
| CN | 113888961 A | 1/2022 |
| JP | 2012155143 A | 8/2012 |

* cited by examiner

ELECTRONIC DEVICE WITH FOLDABLE SCREEN AND CONTROL METHOD

CROSS-REFERENCE TO RELATED APPLICATIONS

This application is a National Stage of International Application No. PCT/CN2022/072959, filed on Jan. 20, 2022, which claims priority to Chinese Patent Application No. 202110245285.5, filed on Mar. 5, 2021 and Chinese Patent Application No. 202110552769.4, filed on May 20, 2021. The disclosures of which are incorporated herein by reference in their entireties.

TECHNICAL FIELD

This application relates to the technical field of electronic devices, and in particular, to an electronic device with a foldable screen and a control method.

BACKGROUND

With the continuous development of electronic devices, more electronic devices with a display screen, for example, mobile phones with a display screen, are widely used in people's daily life and work. In addition, it is not difficult to find that, with the development of screen technologies, display screens of electronic devices have been made increasingly large, so as to provide users with richer information and a better user experience. However, an electronic device with an excessively large display screen is not easy to carry. Therefore, electronic devices with a foldable screen (for example, foldable mobile phones) proposed in recent years are the development trend of future electronic devices. In addition, how to further increase the screen-to-body ratio of the electronic device with a foldable screen is an important research direction for manufacturers.

SUMMARY

Embodiments of this application provide an electronic device with a foldable screen and a control method, which can increase the screen-to-body ratio of the electronic device.

To achieve the foregoing objective, the following technical solutions are used in the embodiments of this application:

According to a first aspect, some embodiments of this application provide an electronic device with a foldable screen. The electronic device includes the foldable screen and a controller. The foldable screen includes a light-transmitting cover plate and a display panel that are stacked. The display panel includes a display region and a non-display region surrounded by the display region. The display region may surround the entire non-display region, or surround three sides, two sides, or one side of the non-display region in a circumferential direction. A light-shielding layer is arranged between the light-transmitting cover plate and the display panel. The controller is electrically connected to the foldable screen. The foldable screen is foldable between a first state and a second state. When the foldable screen is in the first state, an orthographic projection of the light-shielding layer on the display panel overlaps with the non-display region and does not overlap with the display region. When the foldable screen is in the second state, the controller is configured to control a first part in the display region adjacent to and surrounding the non-display region to be in a black screen state.

To enable the first part to be in the black screen state, pixels in the first part may be turned off, or gray values of the pixels in the first part may be set to 0, or the gray values are set to any value in a range greater than 0 (for example, [0, 128]), so that the first part displays black or gray, which is not particularly limited herein.

In addition, the foldable screen may be an inward foldable screen or an outward foldable screen. The first state is one of an unfolded state, a half-folded state, or a folded state of the foldable screen, and the second state is one of the unfolded state, the half-folded state, or the folded state of the foldable screen. The first state and the second state are two different states.

In this way, when the foldable screen is in the second state, the first part is controlled to be in the black screen state, so that the area of an effective display region can be reduced, thereby preventing the light-shielding layer from blocking the display content. When the foldable screen is in the first state, the first part may be controlled to display images and videos normally, to ensure the screen-to-body ratio of the foldable screen in the first state.

In a possible implementation of the first aspect, an outer edge of the non-display region and an outer edge of the light-shielding layer are circular edges. A difference between a diameter of the outer edge of the non-display region and a diameter of the outer edge of the light-shielding layer is less than or equal to 0.9 mm. In other words, when a center of the light-shielding layer is aligned with a center of the non-display region, a one-sided gap between the outer edge of the light-shielding layer and the outer edge of the non-display region is less than or equal to 0.45 mm. However, in the prior art, the one-sided gap is usually greater than 0.45 mm. Therefore, with a specific diameter of the outer edge of the light-shielding layer, the diameter of the outer edge of the non-display region is reduced, thereby increasing the area of the display region and increasing the screen-to-body ratio.

In a possible implementation of the first aspect, the difference between the diameter of the outer edge of the non-display region and the diameter of the outer edge of the light-shielding layer is greater than or equal to 0.2 mm and less than or equal to 0.8 mm. In this way, the screen-to-body ratio of the foldable screen can be further increased. In addition, when the center of the light-shielding layer is aligned with the center of the non-display region, a gap between the outer edge of the non-display region and the outer edge of the light-shielding layer is moderate, thereby preventing the light-shielding layer from blocking the display region to some extent when the foldable screen is in the first state due to an assembly error during assembly.

In a possible implementation of the first aspect, the foldable screen is an inward foldable screen. The first state is an unfolded state, and the second state is a folded state. For an electronic device with an inward foldable screen, the use frequency of the foldable screen in the unfolded state is relatively high. Therefore, the screen-to-body ratio of the foldable screen in a commonly used state can be increased, thereby effectively improving user experience.

In a possible implementation of the first aspect, the foldable screen is an outward foldable screen. The first state is a folded state, and the second state is an unfolded state. For an electronic device with an outward foldable screen, the use frequency of the foldable screen in the folded state is relatively high. Therefore, the screen-to-body ratio of the foldable screen in a commonly used state can be increased, thereby effectively improving user experience.

In a possible implementation of the first aspect, the foldable screen is an inward foldable screen or an outward foldable screen, the first state is a half-folded state, and the second state is a folded state or an unfolded state.

In a possible implementation of the first aspect, the foldable screen is foldable into a first screen and a second screen. The electronic device further includes an angle detector. The angle detector is electrically connected to the controller. The angle detector is configured to detect an included angle between the first screen and the second screen to obtain an included angle value. The controller is configured to determine a state of the foldable screen according to the included angle value, and control the first part to be or not to be in the black screen state according to the state of the foldable screen. In this way, the state of the foldable screen can be determined by automatically detecting the included angle between the first screen and the second screen by the angle detector, which is convenient to operate, provides a high degree of automation, and makes it less difficult to determine the state of the foldable screen.

In a possible implementation of the first aspect, when the foldable screen is an inward foldable screen, the first state corresponds to an unfolded state of the inward foldable screen, and the second state corresponds to a folded state of the inward foldable screen. If the angle detector detects that the included angle between the first screen and the second screen is within a first preset range, the controller determines that the foldable screen is in the first state. If the angle detector detects that the included angle between the first screen and the second screen is within a third preset range, the controller determines that the foldable screen is in the second state. When it is determined that the foldable screen is in the second state, the controller controls the first part to be in the black screen state. When it is determined that the foldable screen is in the first state, the controller controls the first part to display normally.

In a possible implementation of the first aspect, when the foldable screen is an outward foldable screen, the first state corresponds to a folded state of the outward foldable screen, and the second state corresponds to an unfolded state of the outward foldable screen. If the angle detector detects that the included angle between the first screen and the second screen is within a sixth preset range, the controller determines that the foldable screen is in the first state. If the angle detector detects that the included angle between the first screen and the second screen is within a fourth preset range, the controller determines that the foldable screen is in the second state. When it is determined that the foldable screen is in the second state, the controller controls the first part to be in the black screen state. When it is determined that the foldable screen is in the first state, the controller controls the first part to display normally.

In a possible implementation of the first aspect, the foldable screen is foldable into a first screen and a second screen. An included angle between the first screen and the second screen is $\alpha$, and when the foldable screen is in the first state, $\alpha=\alpha 1$. When the foldable screen is in the second state, $\alpha=\alpha 2$. The first part is annular, an inner diameter of the first part is R1, and an outer diameter of the first part is R2. When $\alpha=\alpha 1$, $r=R1$, and when $\alpha=\alpha 2$, $r=R2$. When the foldable screen changes from the first state to the second state, the controller is further configured to control an annular region adjacent to and surrounding the non-display region to be in the black screen state, an inner diameter of the annular region is equal to R1, and there is a preset functional relationship between an outer diameter r of the annular region and $\alpha$. In this way, the light-shielding layer is prevented from blocking the display content of the display region when the foldable screen is in other states except the first state and the second state.

In a possible implementation of the first aspect, the preset functional relationship is:

when $\alpha \in [\alpha 1, \theta], r=R1$; and when $\alpha \in [\theta, \alpha 2], r=R2$, where $\theta$ is a preset value between $\alpha 1$ and $\alpha 2$.

In a possible implementation of the first aspect, the preset functional relationship is:

$r=[(\alpha-\alpha 1)/(\alpha 2-\alpha 1)]R2+[(\alpha 2-\alpha)/(\alpha 2-\alpha 1)]R1.$ In a possible implementation of the first aspect, a first opening is provided in the non-display region. A second opening is provided in the light-shielding layer. The electronic device further includes a camera module. The camera module is located at a side of the display panel away from the light-transmitting cover plate. A light incident end of the camera module is located in the first opening. A light incident surface of the camera module faces a region opposite to the second opening on the light-transmitting cover plate. In this way, the non-display region can avoid the camera module.

According to a second aspect, some embodiments of this application provide a control method for an electronic device, and the electronic device includes a foldable screen. The foldable screen includes a light-transmitting cover plate and a display panel that are stacked. The display panel includes a display region and a non-display region surrounded by the display region. The display region may surround the entire non-display region, or surround three sides, two sides, or one side of the non-display region in a circumferential direction. A light-shielding layer is arranged between the light-transmitting cover plate and the display panel. The control method includes:

determining a state of the foldable screen, where the state of the foldable screen is a first state or a second state, and when the foldable screen is in the first state, an orthographic projection of the light-shielding layer on the display panel overlaps with the non-display region and does not overlap with the display region; and when the foldable screen is in the second state, controlling a first part in the display region adjacent to and surrounding the non-display region to be in a black screen state.

To enable the first part to be in the black screen state, pixels in the first part may be turned off, or gray values of the pixels in the first part may be set to 0, or the gray values are set to any value in a range greater than 0 (for example, [0, 128]), so that the first part displays black or gray, which is not particularly limited herein.

In addition, the foldable screen may be an inward foldable screen or an outward foldable screen. The first state is one of an unfolded state, a half-folded state, or a folded state of the foldable screen, and the second state is one of the unfolded state, the half-folded state, or the folded state of the foldable screen. The first state and the second state are two different states.

In this way, when the foldable screen is in the second state, the first part is controlled to be in the black screen state, so that the area of an effective display region can be reduced, thereby preventing the light-shielding layer from blocking the display content. When the foldable screen is in the first state, the first part may be controlled to display images and videos normally, to ensure the screen-to-body ratio of the foldable screen in the first state.

In a possible implementation of the second aspect, the foldable screen is an inward foldable screen. The first state is an unfolded state, and the second state is a folded state. For an electronic device with an inward foldable screen, the use frequency of the foldable screen in the unfolded state is relatively high. Therefore, the screen-to-body ratio of the foldable screen in a commonly used state can be increased, thereby effectively improving user experience.

In a possible implementation of the second aspect, the foldable screen is an outward foldable screen. The first state is a folded state, and the second state is an unfolded state. For an electronic device with an outward foldable screen, the use frequency of the foldable screen in the folded state is relatively high. Therefore, the screen-to-body ratio of the foldable screen in a commonly used state can be increased, thereby effectively improving user experience.

In a possible implementation of the second aspect, the foldable screen is foldable into a first screen and a second screen. The determining a state of the foldable screen includes: detecting an included angle between the first screen and the second screen to obtain an included angle value; and determining the state of the foldable screen according to the included angle value. In this way, the state of the foldable screen can be determined by automatically detecting the included angle between the first screen and the second screen, which is convenient to operate, provides a high degree of automation, and makes it less difficult to determine the state of the foldable screen.

In a possible implementation of the second aspect, the foldable screen is foldable into a first screen and a second screen. An included angle between the first screen and the second screen is $\alpha$, and when the foldable screen is in the first state, $\alpha=\alpha1$. When the foldable screen is in the second state, $\alpha=\alpha2$. The first part is annular, an inner diameter of the first part is R1, and an outer diameter of the first part is R2. When $\alpha=\alpha1$, r=R1, and when $\alpha=\alpha2$, r=R2. The control method further includes: when the foldable screen changes from the first state to the second state, controlling an annular region adjacent to and surrounding the non-display region to be in the black screen state, where an inner diameter of the annular region is equal to R1, and there is a preset functional relationship between an outer diameter r of the annular region and $\alpha$. In this way, the light-shielding layer is prevented from blocking the display content of the display region when the foldable screen is in other states except the first state and the second state.

In a possible implementation of the first aspect, the preset functional relationship is:

when $\alpha \in [\alpha1, \theta)$, $r=R1$; and when $\alpha \in [\theta, \alpha2]$, $r=R2$, where $\theta$ is a preset value between $\alpha1$ and $\alpha2$.

In a possible implementation of the first aspect, the preset functional relationship is:

$r=[(\alpha-\alpha1)/(\alpha2-\alpha1)]R2+[(\alpha2-\alpha)/(\alpha2-\alpha1)]R1$.

According to a third aspect, some embodiments of this application provide a computer storage medium. The computer storage medium includes computer instructions. The computer instructions, when run on an electronic device, cause the electronic device to perform the control method according to any of the foregoing technical solutions.

According to a fourth aspect, some embodiments of this application further provide a computer program product.

The computer program product, when run on a computer, causes the computer to perform the control method according to any of the foregoing technical solutions.

The computer storage medium or the computer program product provided in the embodiments of this application is configured to perform the control method according to any of the foregoing technical solutions. Therefore, for beneficial effects that can be achieved, refer to the beneficial effects of the corresponding control method described above. Details are not described herein again.

DETAILED DESCRIPTION OF ILLUSTRATIVE EMBODIMENTS

In the embodiments of this application, terms such as "first", "second", "third", "fourth", "fifth", and "sixth" are used merely for the purpose of description, and should not be understood as indicating or implying the relative importance or implicitly specifying the number of the indicated technical features. Therefore, features defining "first", "second", "third", "fourth", "fifth", and "sixth" may explicitly or implicitly include one or more such features.

In the embodiments of this application, terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses.

This application provides an electronic device 100. The electronic device 100 is an electronic device with a foldable screen. Specifically, the electronic device 100 includes but is not limited to an electronic device such as a mobile phone, a tablet personal computer (tablet personal computer), a laptop computer (laptop computer), a personal digital assistant (personal digital assistant, PDA), a personal computer, a notebook computer, an in-vehicle device, and a wearable device (for example, a watch).

Figure 1:
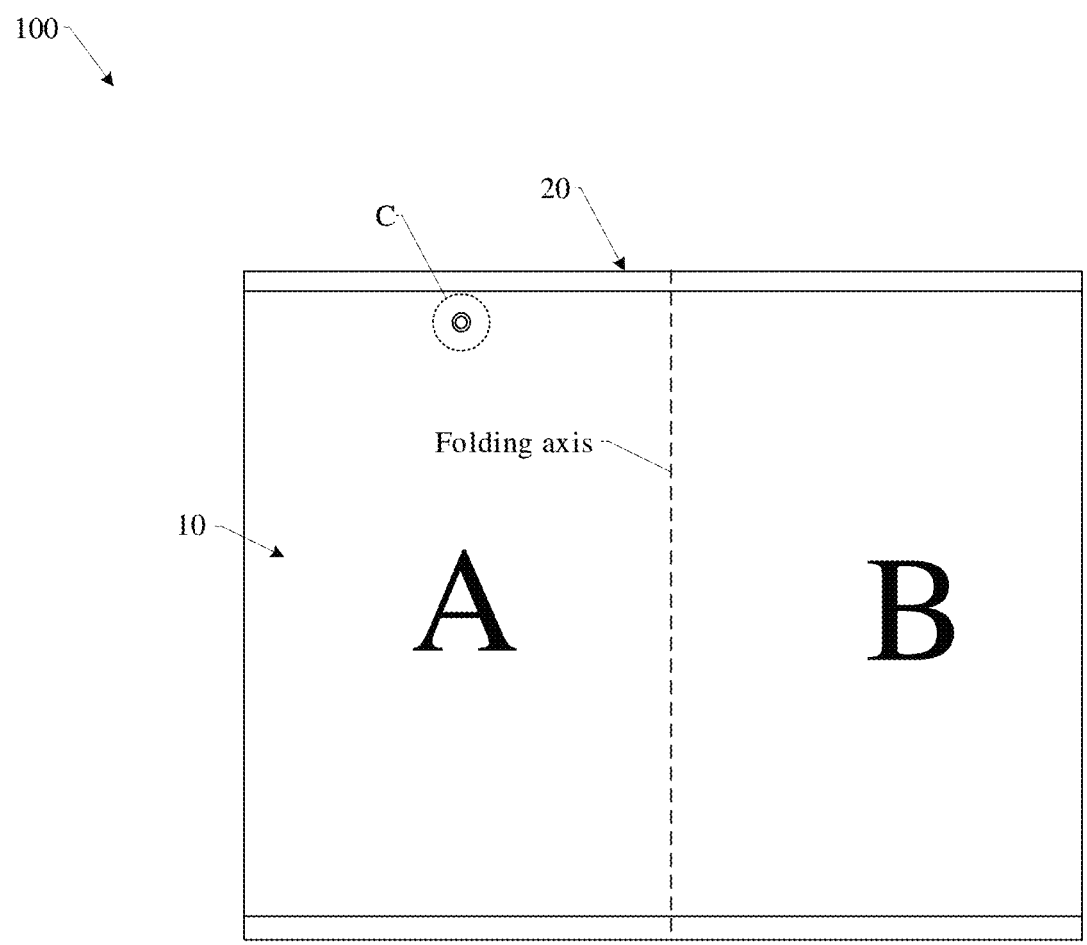
FIG. 1 is a schematic structural diagram of an electronic device according to some embodiments of this application.

FIG. 1 is a schematic structural diagram of an electronic device 100 according to some embodiments of this application. In this embodiment, the electronic device 100 is a foldable mobile phone. The electronic device 100 includes a foldable screen 10 and a housing 20. It can be understood that FIG. 1 only schematically show some components included in the electronic device 100, and the actual shapes, actual sizes, actual positions, and actual structures of these components are not limited by FIG. 1.

The foldable screen 10 is configured to display images, videos, and the like. The foldable screen 10 is foldable to form at least two screens. In the following embodiments, an example in which the foldable screen 10 is foldable to form two screens only is used for description. When the foldable screen 10 is foldable into three or more screens, a specific shape and a folding method of the foldable screen 10 may be deduced with reference to the relevant description of folding into two screens. Therefore, details are not described again in this embodiment of this application.

For example, the foldable screen 10 is foldable into a first screen A and a second screen B. A folding axis is formed between the first screen A and the second screen B. To make the foldable screen 10 be foldable into the first screen A and the second screen B, at least a region in which the folding axis is located on the foldable screen 10 is made of a flexible material. The remaining region on the foldable screen 10 may be made of flexible materials, rigid materials, or partially rigid materials and partially flexible materials, which is not particularly limited herein.

It should be noted that, the two screens formed after the foldable screen 10 in this embodiment of this application is folded may be two screens that exist independently. In other words, the region in which the folding axis is located is not used for display, and the foldable screen 10 is divided into two independent display interfaces by the region in which the folding axis is located. The two screens formed after the foldable screen 10 is folded may alternatively be a full screen of an integrated structure that is folded to form at least two parts. In other words, the region in which the folding axis is located is used for display, and a whole display interface is formed by the region in which the folding axis is located and regions located at both sides of the folding axis.

In this embodiment of this application, the foldable screen 10 may be of the following two types. One type is a foldable screen that is folded inward (referred to as an inward foldable screen below), and the other type is a foldable screen that is folded outward (referred to as an outward foldable screen below). An example in which the foldable screen 10 is foldable to form the first screen A and the second screen B is used. After the inward foldable screen is folded, the first screen A and the second screen B face each other. After the outward foldable screen is folded, the first screen A and the second screen B face away from each other.

Figure 2:
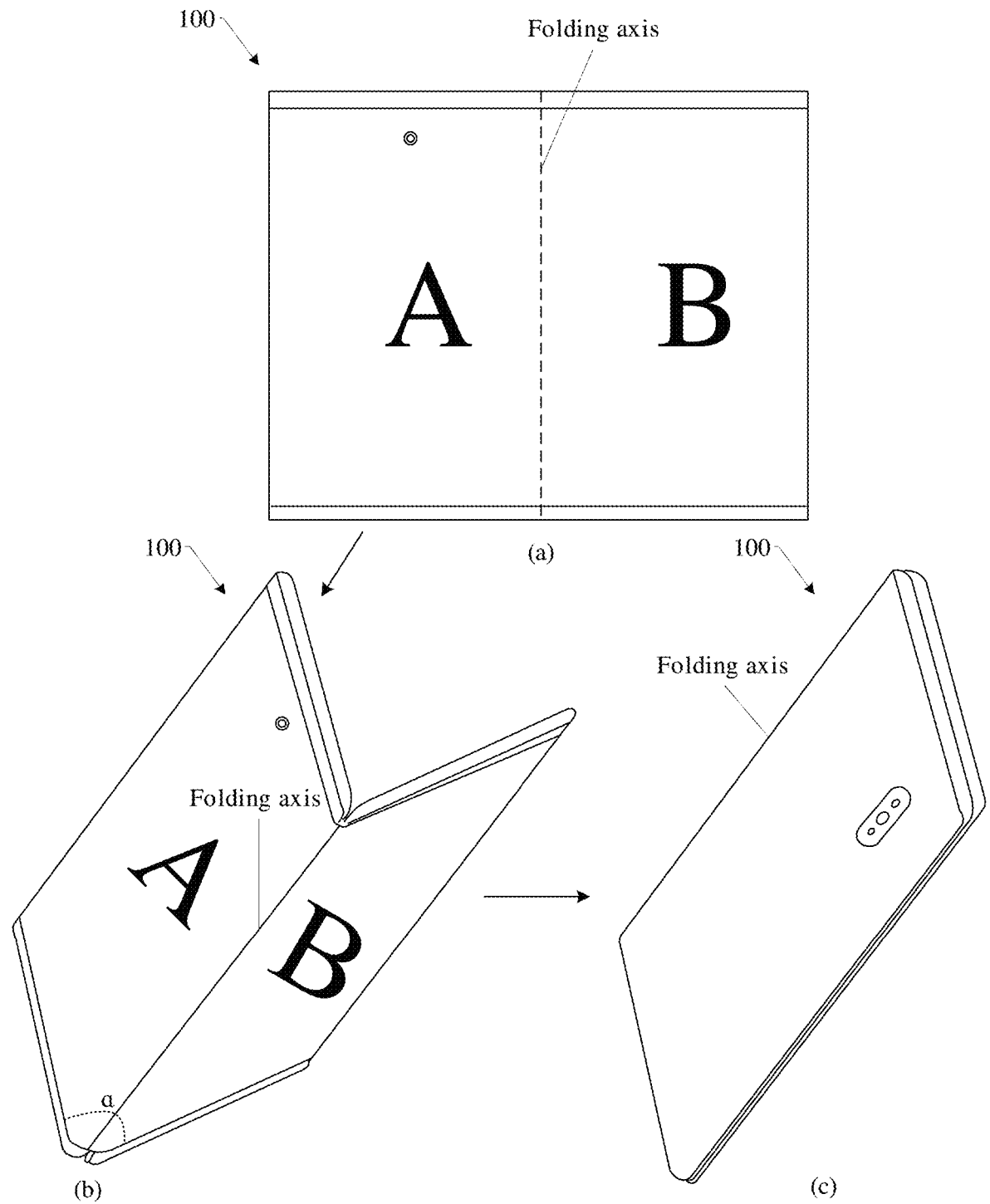
FIG. 2 is a schematic structural diagram of an electronic device with an inward foldable screen according to some embodiments of this application, where (a) in FIG. 2 is a schematic structural diagram of the electronic device with the inward foldable screen in an unfolded state; (b) in FIG. 2 is a schematic structural diagram of the electronic device with the inward foldable screen in a half-folded state; and (c) in FIG. 2 is a schematic structural diagram of the electronic device with the inward foldable screen in a folded state.

Specifically, FIG. 2 is a schematic structural diagram of an electronic device 100 with an inward foldable screen according to some embodiments of this application. In this embodiment, the foldable screen 10 is foldable into a first screen A and a second screen B.

Specifically, (a) in FIG. 2 is a schematic structural diagram of the electronic device 100 with the inward foldable screen in an unfolded state. In this state, the first screen A and the second screen B face the same side. In addition, in this state, an included angle α between the first screen A and the second screen B is within a first value range. The first value range may be [170°, 190°], or may be [175°, 185°].

It should be noted that, in the descriptions of this embodiment and the following embodiments, the included angle α between the first screen A and the second screen B refers to an included angle between the first screen A and the second screen B at a display side of the foldable screen 10. The display side of the foldable screen 10 refers to a side of the foldable screen 10 at which images and videos are displayed. When a user is at the display side of the foldable screen 10, the user may watch the images or the videos displayed by the foldable screen 10.

The inward foldable screen described above is folded along the folding axis, so that an inward foldable screen in a half-folded state shown in (b) in FIG. 2 can be formed. In this state, the included angle α between the first screen A and the second screen B is within a second value range. The second value range may be [10°, 170°], or may be [5°, 175°].

Further, the inward foldable screen continues to be folded along the folding axis, so that an inward foldable screen in a folded state shown in (c) in FIG. 2 can be formed. In this state, the foldable screen 10 is completely folded, the first screen A and the second screen B face each other, and the included angle α between the first screen A and the second screen B is within a third value range. The third value range may be [−10°, 10°], or may be [−5°, 5°]. In addition, in this state, the foldable screen 10 is invisible to users.

Figure 3:
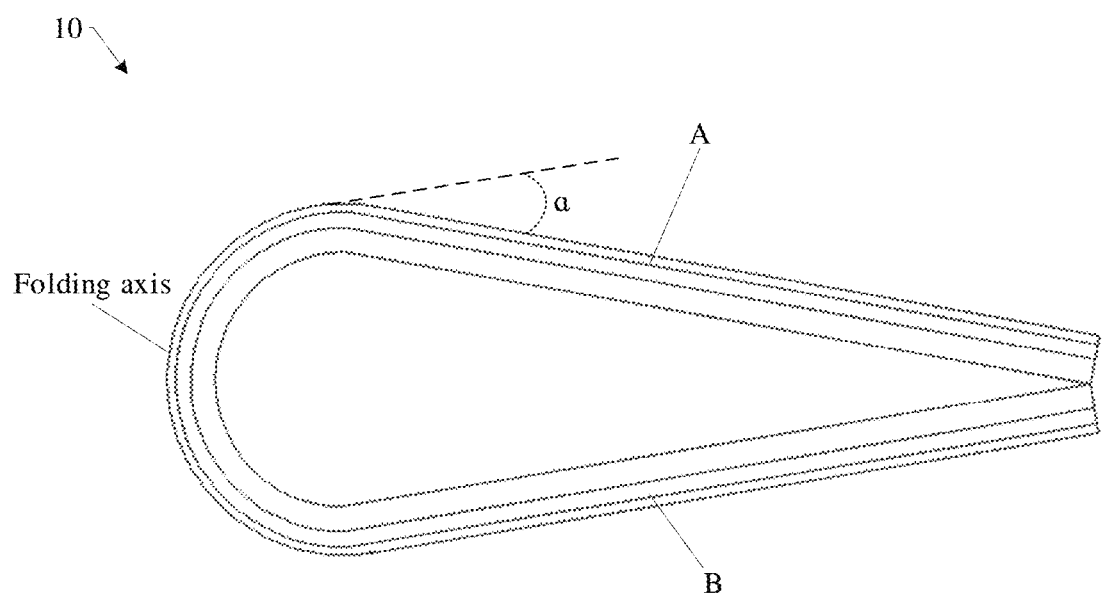
FIG. 3 is a schematic structural diagram of an inward foldable screen in a folded state according to some embodiments of this application.

In the foregoing embodiments, it should be noted that, when the included angle α is a negative number, refer to FIG. 3. FIG. 3 is a schematic structural diagram of an inward foldable screen in a folded state according to some embodiments of this application. In this state, the included angle α between the first screen A and the second screen B is less than 0°. An edge of the first screen A farther away from the folding axis is closer to the second screen B than an edge of the first screen A closer to the folding axis.

It can be understood that, for the electronic device 100 with an inward foldable screen, when the foldable screen 10 is in the folded state, the foldable screen 10 is invisible to users, and the first screen A and the second screen B may be protected by the housing 20. When the foldable screen 10 is in the unfolded state, displaying on a large screen may be achieved through the first screen A and the second screen B. In this state, the screen-to-body ratio of the foldable screen 10 needs to be increased to provide users with richer information and a better user experience.

Figure 4:
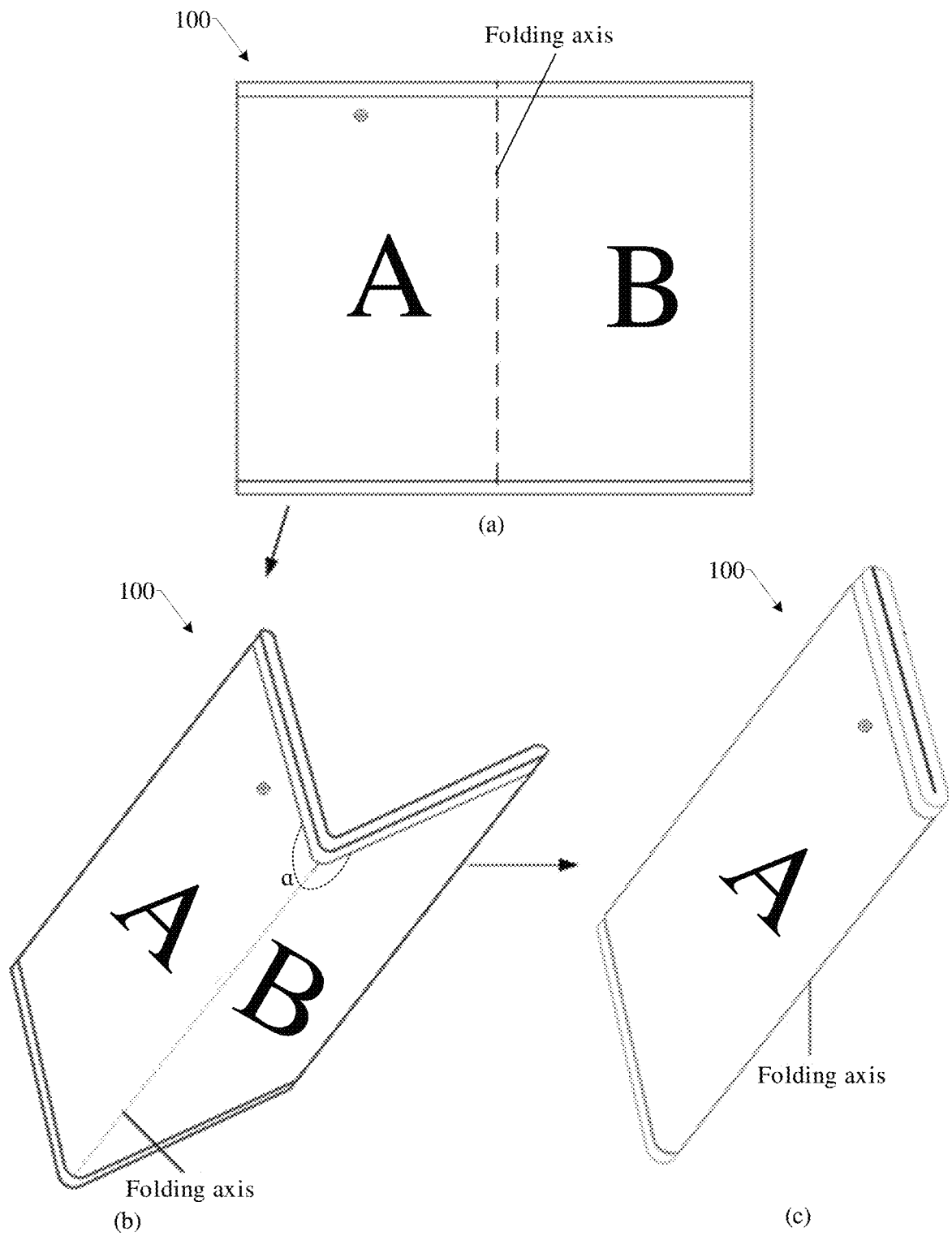
FIG. 4 is a schematic structural diagram of an electronic device with an outward foldable screen according to some embodiments of this application, where (a) in FIG. 4 is a schematic structural diagram of the electronic device with the outward foldable screen in an unfolded state; (b) in FIG. 4 is a schematic structural diagram of the electronic device with the outward foldable screen in a half-folded state; and (c) in FIG. 4 is a schematic structural diagram of the electronic device with the outward foldable screen in a folded state.

In another example, FIG. 4 is a schematic structural diagram of an electronic device 100 with an outward foldable screen according to some embodiments of this application. In this embodiment, the foldable screen 10 is foldable into a first screen A and a second screen B.

Specifically, (a) in FIG. 4 is a schematic diagram of a shape of the outward foldable screen in an unfolded state. In this state, the first screen A and the second screen B face or approximately face the same side. In addition, in this state, the included angle between the first screen A and the second screen B is within a fourth value range. The fourth value range may be [170°, 190°], or may be [175°, 185°], which is not particularly limited herein.

The outward foldable screen described above is folded along the folding axis, so that an outward foldable screen in a half-folded state shown in (b) in FIG. 4 can be formed. In this state, the included angle α between the first screen A and the second screen B is within a fifth value range. The fifth value range may be [190°, 350°], or may be [185°, 355°], which is not particularly limited herein.

Further, the outward foldable screen continues to be folded along the folding axis, so that an outward foldable screen in a folded state shown in (c) in FIG. 4 can be formed. In this state, the foldable screen 10 is completely folded, the first screen A and the second screen B face away from each other, and the included angle α between the first screen A and the second screen B is within a sixth value range. The sixth value range may be [350°, 370°], or may be [355°, 365°]. In addition, in this state, the foldable screen 10 is visible to users.

It can be understood that, for the electronic device 100 with an outward foldable screen, when the foldable screen 10 is in the folded state, an interface may be displayed on the first screen A or the second screen B. In this state, the electronic device 100 is small in size and easy to carry, and therefore, this state is a commonly used state of the outward foldable screen. If the screen-to-body ratio can be further increased in this state, user experience can be greatly improved. When the foldable screen 10 is in the unfolded state, displaying on a large screen may be achieved through the first screen A and the second screen B. This state is usually used in a scenario that requires displaying on a large screen, for example, when watching videos or movies, and usually is not a commonly used state of the outward foldable screen.

Figure 5:
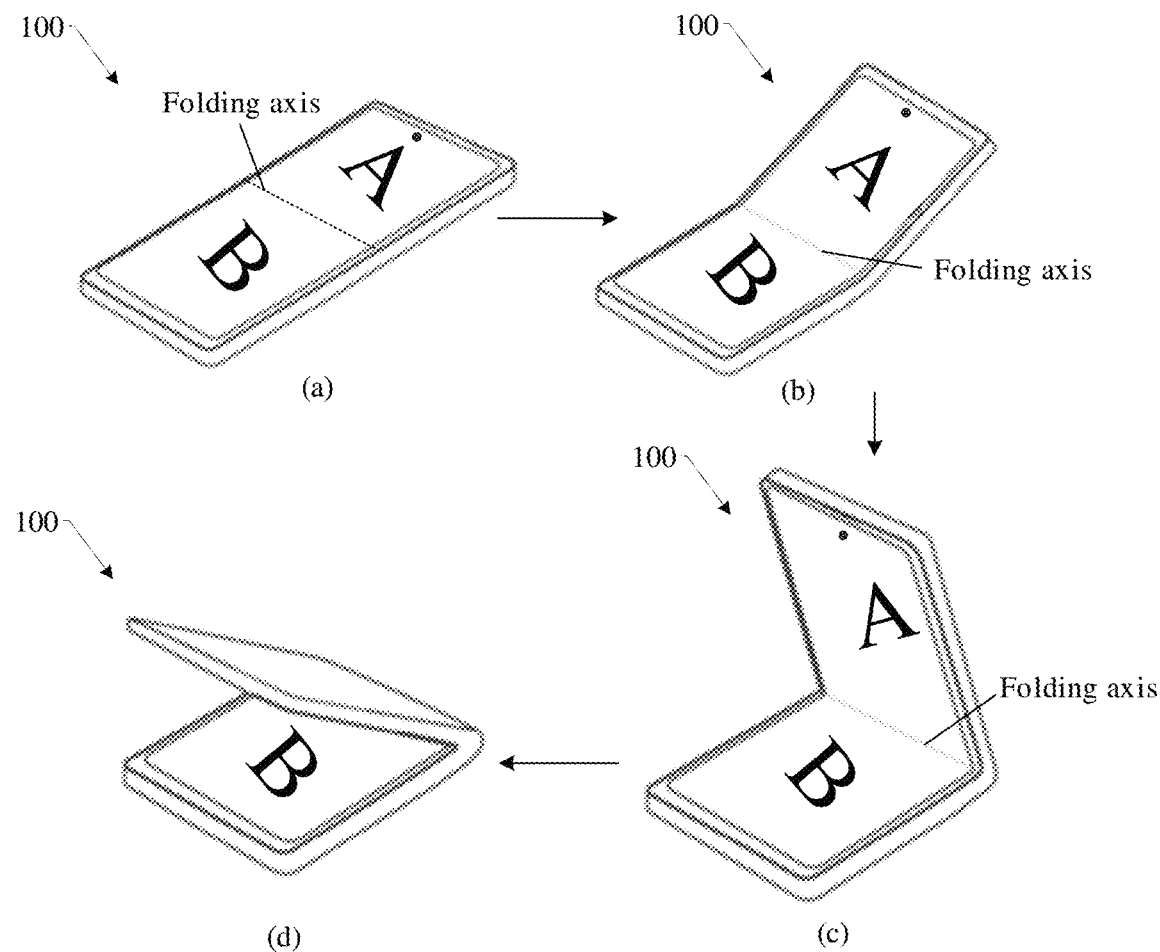
FIG. 5 is a schematic structural diagram of an electronic device with a foldable screen folded along a longitudinal direction according to some embodiments of this application, where (a) in FIG. 5 is a schematic structural diagram of the electronic device with the foldable screen in an unfolded state; and (b) to (d) in FIG. 5 are schematic structural diagrams of the electronic device with the foldable screen in a half-folded state.

In the foregoing embodiments shown in FIG. 1 to FIG. 4, the foldable screen of the electronic device is folded along a horizontal direction to achieve the folding of the foldable screen. Certainly, the foldable screen of the electronic device may alternatively be folded along a longitudinal direction to achieve the folding of the foldable screen. For example, FIG. 5 is a schematic structural diagram of an electronic device 100 with a foldable screen folded along a longitudinal direction according to some embodiments of this application. In this embodiment, the foldable screen is an inward foldable screen. The foldable screen 10 is foldable into a first screen A and a second screen B. Specifically, (a) in FIG. 5 is a schematic structural diagram of the electronic device 100 with the foldable screen in an unfolded state. During folding the foldable screen along the folding axis, the electronic device 100 with the foldable screen in the half-folded state shown in (b) in FIG. 5, (c) in FIG. 5, and (d) in FIG. 5 may be sequentially formed.

Figure 6:
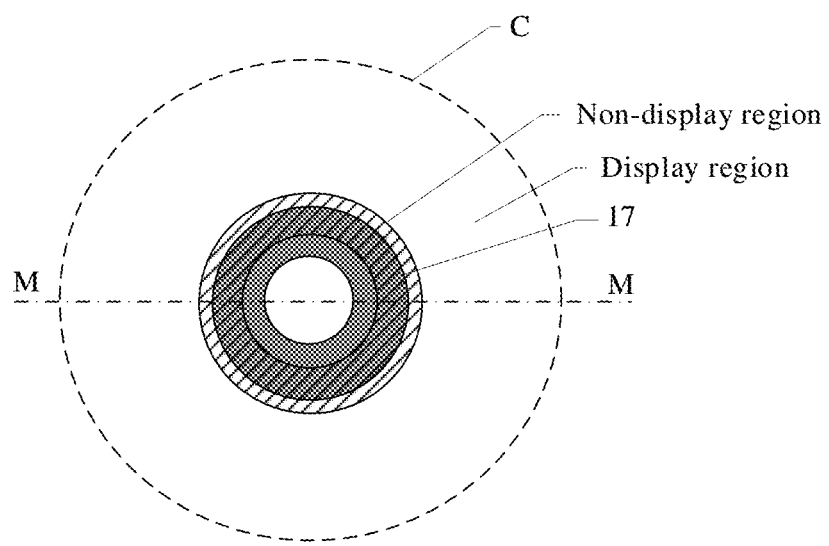
FIG. 6 is a partial enlarged view of region C in the electronic device shown in FIG. 1.
Figure 7:
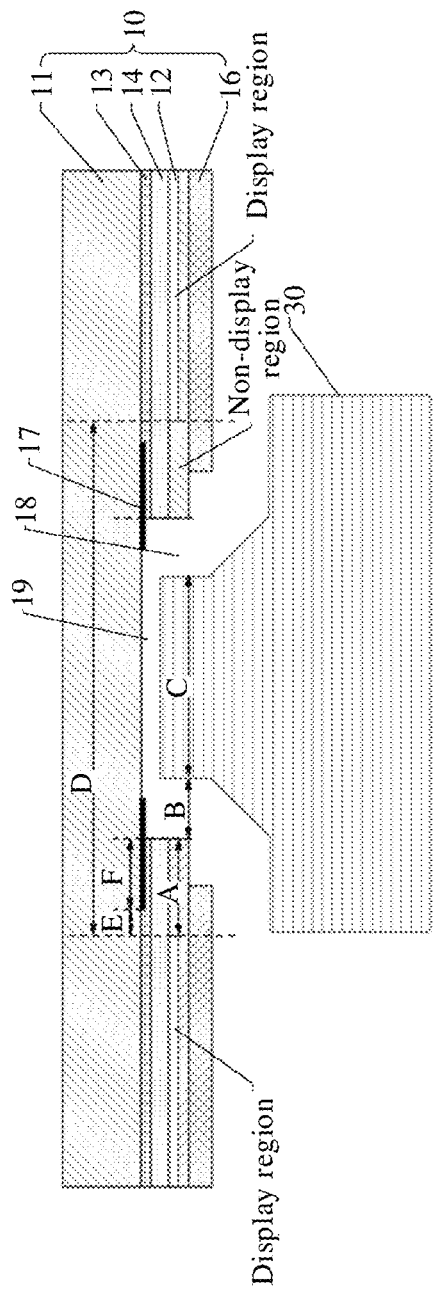
FIG. 7 is a schematic structural cross-sectional view of the electronic device shown in FIG. 6 taken along line M-M.

FIG. 6 is a partial enlarged view of region C of the electronic device 100 shown in FIG. 1, and FIG. 7 is a schematic structural cross-sectional view of the electronic device shown in FIG. 6 taken along line M-M. In this embodiment, the foldable screen 10 includes at least a light-transmitting cover plate 11 and a display panel 12. The light-transmitting cover plate 11 is configured to define an internal accommodating cavity of the electronic device with the housing 20 in FIG. 1, and the internal accommodating cavity is used for accommodating internal electronic components of the electronic device 100. The display panel 12 is an internal electronic component of the electronic device 100. The display panel 12 is stacked at an inner side of the light-transmitting cover plate 11. The inner side of the light-transmitting cover plate 11 refers to a side of the light-transmitting cover plate 11 that is close to the inner accommodating cavity of the electronic device 100. The light-transmitting cover plate 11 is mainly configured to protect the display panel 12 and prevent dust. A material of the light-transmitting cover plate 11 includes but is not limited to plastic. The display panel 12 may be a flexible display panel. For example, the display panel 12 may be an organic light-emitting diode (organic light-emitting diode, OLED) display panel, a micro organic light-emitting diode (micro organic light-emitting diode) display panel, a quantum dot light emitting diode (quantum dot light emitting diodes, QLED) display panel, a liquid crystal display (liquid crystal display, LCD), or the like.

In some embodiments, still referring to FIG. 7, in addition to the light-transmitting cover plate 11 and the display panel 12, the foldable screen 10 further includes a transparent adhesive layer 13, a polarizer 14, and a buffer layer 16. It can be understood that, FIG. 7 only schematically shows some components included in the foldable screen 10, and in addition to these components, the foldable screen 10 further includes other structures, such as a touch layer. In some other embodiments, the foldable screen 10 may alternatively not include at least one of the transparent adhesive layer 13, the polarizer 14, or the buffer layer 16.

Still referring to FIG. 6 and FIG. 7, the display panel 12 includes a display region and a non-display region surrounded by the display region. The non-display region may be arranged in the first screen A or the second screen B, or the non-display region may be partly arranged in the first screen A and partly arranged in the second screen B. In the embodiments shown in FIG. 1, FIG. 6, and FIG. 7, the non-display region is arranged in the first screen A. It should be noted that, the display region may surround the entire non-display region, or surround three sides, two sides, or one side of the non-display region in a circumferential direction. In this application, an example in which the display region surrounds the entire non-display region only is used for description. This cannot be considered as a special limitation to this application.

The display region is a region on the display panel 12 for displaying images and videos. In other words, the display region is a region in the display panel 12 in which array pixels are arranged. The display region is a specific region surrounded by a frame. When the display panel 12 has black spots and bright lines in the display region due to an accident such as dropping, hitting, or scratching, display panel parts at the black spot region and the bright line region still belong to the display region of the display panel 12. Generally, a part of the light-transmitting cover plate 11 opposite to the display region is a light-transmitting part. In other words, there is no light-shielding layer such as a light-shielding ink layer or a light-shielding tape between the light-transmitting cover plate 11 and the display region, so that an image light generated by the display region can be allowed to pass through. In this way, the display of images and videos is achieved.

In addition, the non-display region is a region in the display panel 12 that is not used for display. In other words, the non-display region is a region in the display panel 12 in which no array pixel is arranged. The non-display region usually has signal traces and packaging structures. The non-display region may be used for avoiding structures such as a front camera module, a front fill light, and an earpiece in the electronic device 100. In this application, an example in which the non-display region is used for avoiding the front camera module 30 only is used for description. This cannot be considered as a special limitation to this application. Specifically, referring to FIG. 6 and FIG. 7, a first opening 18 is provided in the non-display region. A head of the front camera module 30 is accommodated in a first opening 18. To clearly describe a relative positional relationship between the non-display region and the front camera module 30, refer to FIG. 7. A one-sided width of the non-display region is A, a diameter of the head of the front camera module 30 is C, and a gap between an edge of the first opening 18 and the head of the camera module is B.

In order to block the non-display region to ensure the display quality of the foldable screen, in some embodiments, referring to FIG. 6 and FIG. 7, a light-shielding layer 17 is arranged between the light-transmitting cover plate 11 and the non-display region. Optionally, the light-shielding layer 17 is arranged on a surface of the light-transmitting cover plate 11 facing the non-display region. The light-shielding layer 17 includes but is not limited to a light-shielding ink layer and a light-shielding tape. In addition, colors of the light-shielding layer 17 include but are not limited to black and gray. In some embodiments, a second opening 19 is provided in the light-shielding layer 17. A part of the light-shielding layer 17 is opposite to the non-display region, and a one-sided width of this part is F. Another part of the light-shielding layer 17 is opposite to a through hole 18. A diameter of an outer edge of the light-shielding layer 17 is smaller than a diameter of an outer edge of the non-display region, and a one-sided gap is E, to prevent the light-shielding layer 17 from blocking the display region of the display panel 12 due to an assembly error during assembly. A light incident surface of the camera module 30 faces the second opening 19. The second opening 19 allows a scene light to pass through the light-transmitting cover plate 11 and then enter the front camera module 30.

In the foregoing embodiments, to increase the screen-to-body ratio of the foldable screen 10, when the light-shielding layer 17 is prevented from blocking the display region of the display panel 12, a value of E is designed to be as small as possible. Currently, the value of E is about 0.25 mm.

Figure 8:
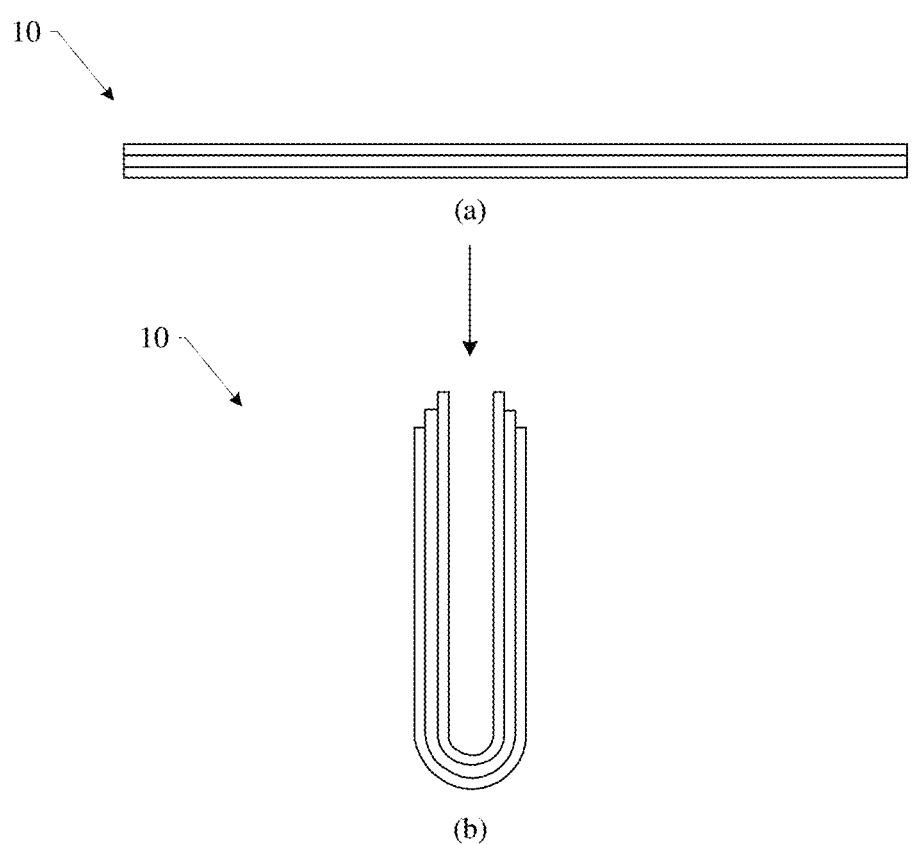
FIG. 8 is a schematic structural diagram of an electronic device with a foldable screen (including an inward foldable screen or an outward foldable screen) changing from an unfolded state to a folded state according to some embodiments of this application, where (a) in FIG. 8 is a schematic structural diagram of the electronic device with the foldable screen in an unfolded state; and (b) in FIG. 8 is a schematic structural diagram of the electronic device with the foldable screen in the folded state.

However, during folding of the foldable screen 10, there is positional displacement among the internal stacked structures. For example, FIG. 8 is a schematic structural diagram of an electronic device 100 with a foldable screen 10 (including an inward foldable screen or an outward foldable screen) changing from an unfolded state to a folded state according to some embodiments of this application. Specifically, (a) in FIG. 8 is a schematic structural diagram of the electronic device with the foldable screen 10 in the unfolded state; and (b) in FIG. 8 is a schematic structural diagram of the electronic device 100 with the foldable screen 10 in the folded state. It can be seen from FIG. 8 that when the foldable screen 10 changes from the unfolded state to the folded state, there is positional displacement among the internal stacked structures.

Figure 9:
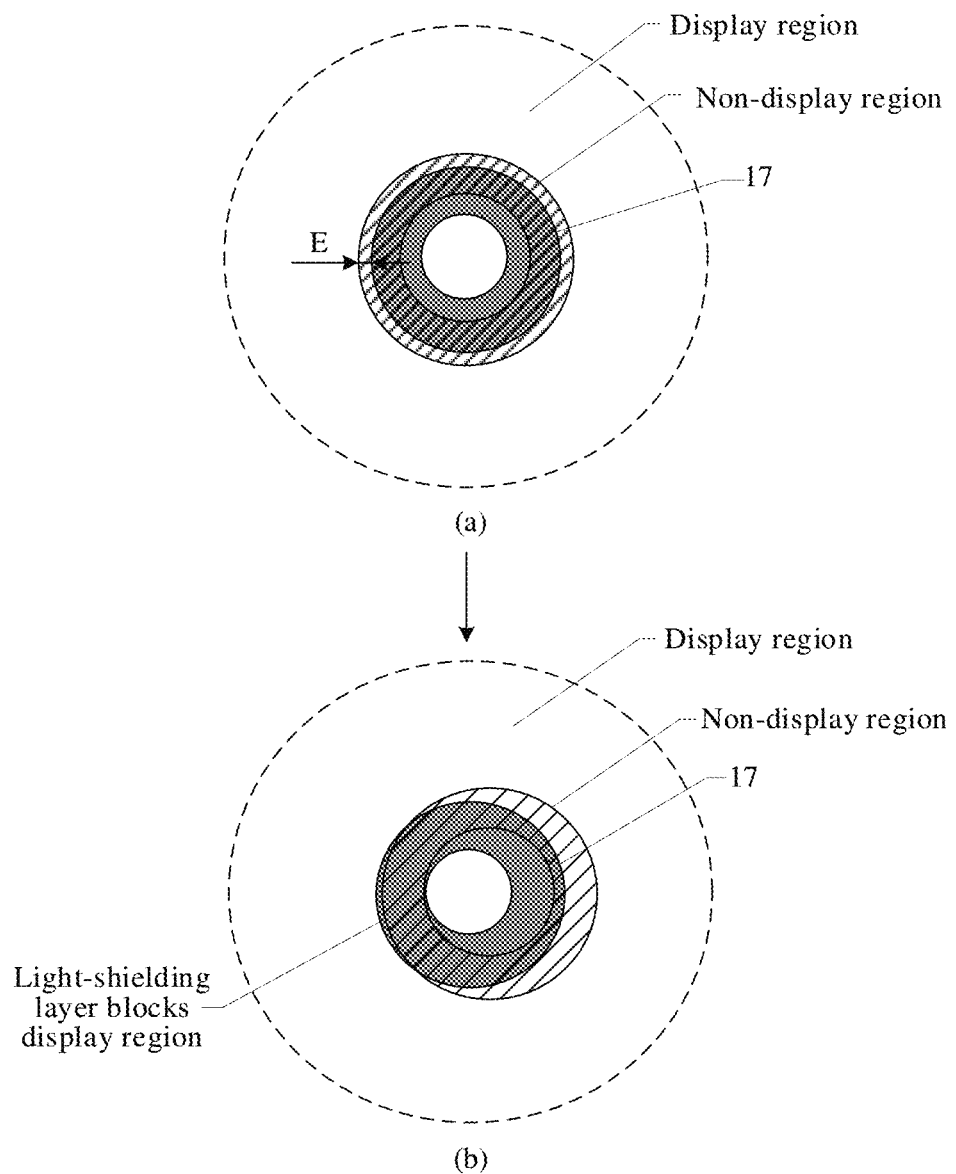
FIG. 9 is a partial schematic structural diagram of an electronic device with a foldable screen changing from an unfolded state to a folded state according to some embodiments of this application, where (a) in FIG. 9 is a partial schematic structural diagram of the electronic device with the foldable screen in the unfolded state; and (b) in FIG. 9 is a partial schematic structural diagram of the electronic device with the foldable screen in the folded state.
Figure 10:
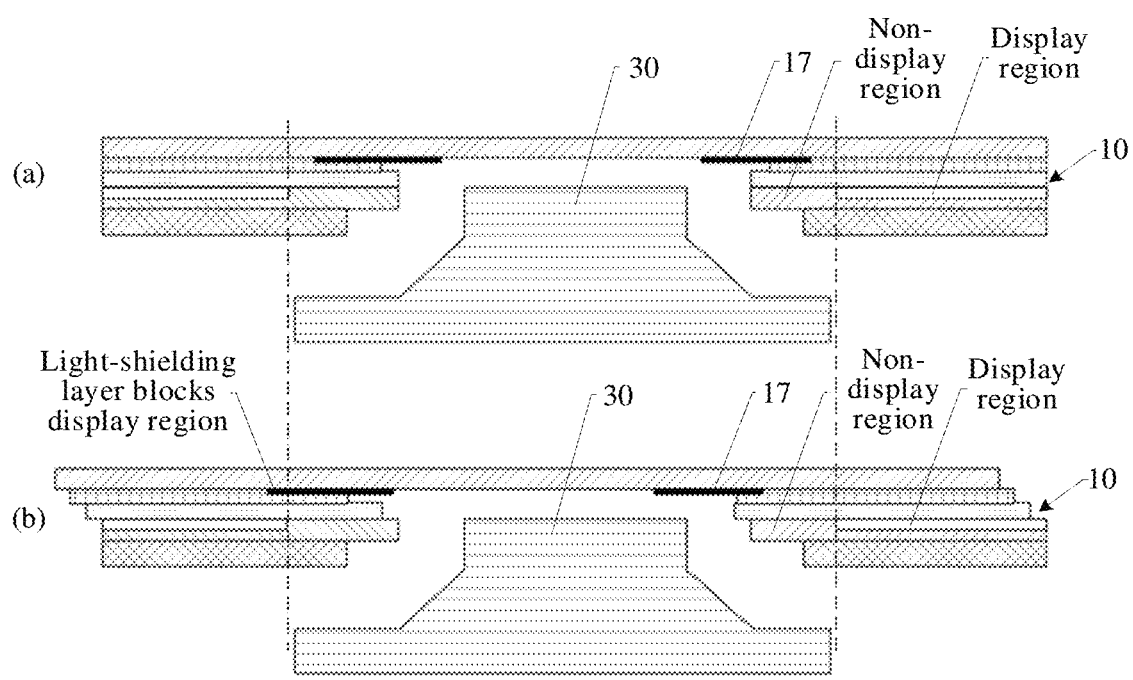
FIG. 10 is a schematic structural cross-sectional view of the electronic device shown in FIG. 9, where (a) in FIG. 10 is a schematic structural cross-sectional view of the electronic device shown in (a) in FIG. 9; and (b) in FIG. 10 is a schematic structural cross-sectional view of the electronic device shown in (b) in FIG. 9.

In this way, there is also positional displacement between the light-shielding layer 17 and the non-display region of the display panel 10 in FIG. 7. For example, refer to FIG. 9 and FIG. 10. FIG. 9 is a partial schematic structural diagram of an electronic device 100 with a foldable screen 10 changing from an unfolded state to a folded state according to some embodiments of this application. FIG. 10 is a schematic structural cross-sectional view of the electronic device shown in FIG. 9. Specifically, (a) in FIG. 9 is a partial schematic structural diagram of the electronic device 100 with the foldable screen 10 in the unfolded state; and (b) in FIG. 9 is a partial schematic structural diagram of the electronic device 100 with the foldable screen 10 in the folded state. (a) in FIG. 10 is a schematic structural cross-sectional view of the electronic device 100 shown in (a) in FIG. 9; and (b) in FIG. 10 is a schematic structural cross-sectional view of the electronic device 100 shown in (b) in FIG. 9. It can be seen from FIG. 9 and FIG. 10 that when the foldable screen 10 is in the unfolded state, an orthographic projection of the light-shielding layer 17 on the display panel 12 overlaps with the non-display region and does not overlap with the display region. In other words, the light-shielding layer 17 only blocks the non-display region and does not block the display region. When the foldable screen 10 changes from the unfolded state to the folded state, the non-display region and the light-shielding layer 17 are displaced, and the orthographic projection of the light-shielding layer 17 on the display panel 12 overlaps with the display region, thereby blocking a part of the display content.

Figure 11:
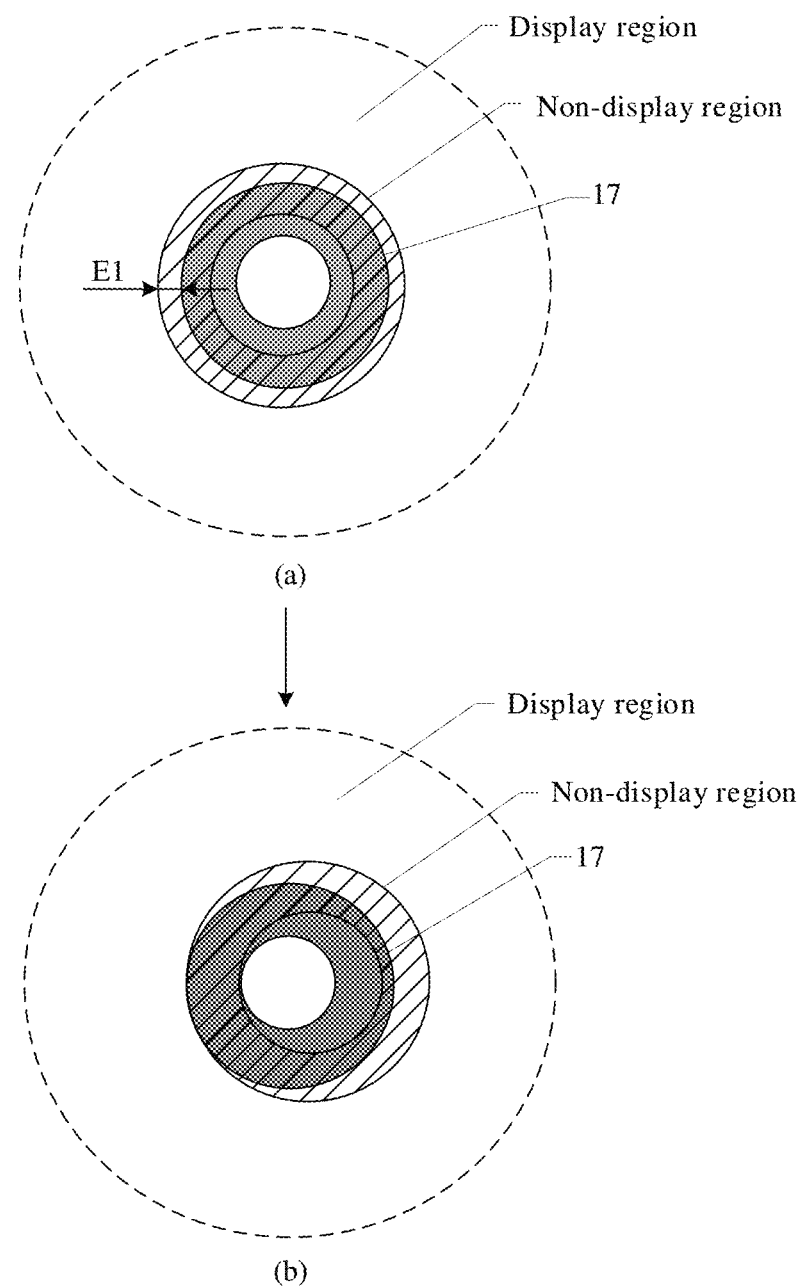
FIG. 11 is a partial schematic structural diagram of an electronic device with a foldable screen changing from an unfolded state to a folded state according to some embodiments of this application, where (a) in FIG. 11 is a partial schematic structural diagram of the electronic device with the foldable screen in the unfolded state; and (b) in FIG. 11 is a partial schematic structural diagram of the electronic device with the foldable screen in the folded state.
Figure 12:
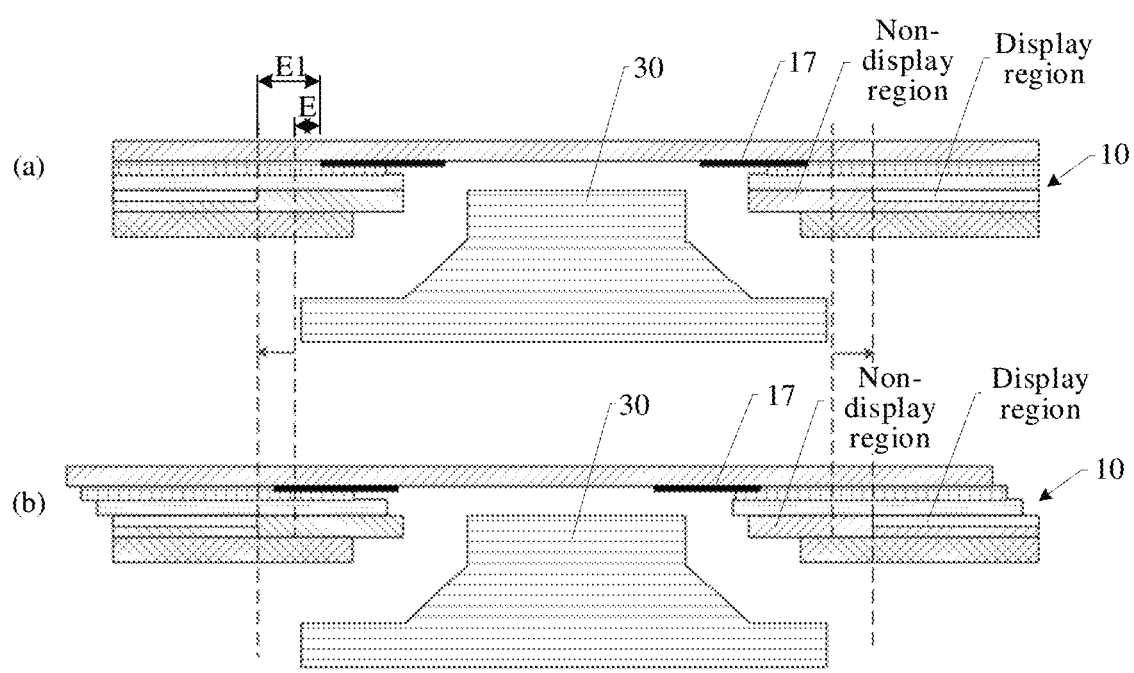
FIG. 12 is a schematic structural cross-sectional view of the electronic device shown in FIG. 11, where (a) in FIG. 12 is a schematic structural cross-sectional view of the electronic device shown in (a) in FIG. 11; and (b) in FIG. 12 is a schematic structural cross-sectional view of the electronic device shown in (b) in FIG. 11.

To resolve the foregoing problems, it is necessary to increase a gap (that is, E described above) between the outer edge of the light-shielding layer 17 and the outer edge of the non-display region. For example, refer to FIG. 11 and FIG. 12. FIG. 11 is a partial schematic structural diagram of an electronic device 100 with a foldable screen 10 changing from an unfolded state to a folded state according to some embodiments of this application. FIG. 12 is a schematic structural cross-sectional view of the electronic device shown in FIG. 11. Specifically, (a) in FIG. 11 is a partial schematic structural diagram of the electronic device 100 with the foldable screen 10 in the unfolded state; and (b) in FIG. 11 is a partial schematic structural diagram of the electronic device 100 with the foldable screen 10 in the folded state. (a) in FIG. 12 is a schematic structural cross-sectional view of the electronic device 100 shown in (a) in FIG. 11; and (b) in FIG. 12 is a schematic structural cross-sectional view of the electronic device 100 shown in (b) in FIG. 11. In the embodiments shown in FIG. 11 and FIG. 12, the gap between the outer edge of the light-shielding layer 17 and the outer edge of the non-display region is increased from the previous E to E1. A value of E1 is usually greater than 0.45 mm. When the foldable screen 10 changes from the unfolded state to the folded state, the non-display region and the light-shielding layer 17 are displaced, and there is a large avoidance margin between the outer edge of the light-shielding layer 17 and the outer edge of the non-display region, to prevent the light-shielding layer 17 from blocking the display region, thereby preventing the light-shielding layer 17 from blocking the display content. However, in this case, the diameter of the outer edge of the non-display region is relatively large. With a specific area of the foldable screen 10, the area of the display region is reduced, resulting in a smaller screen-to-body ratio of the foldable screen 10 in any state.

Figure 13:
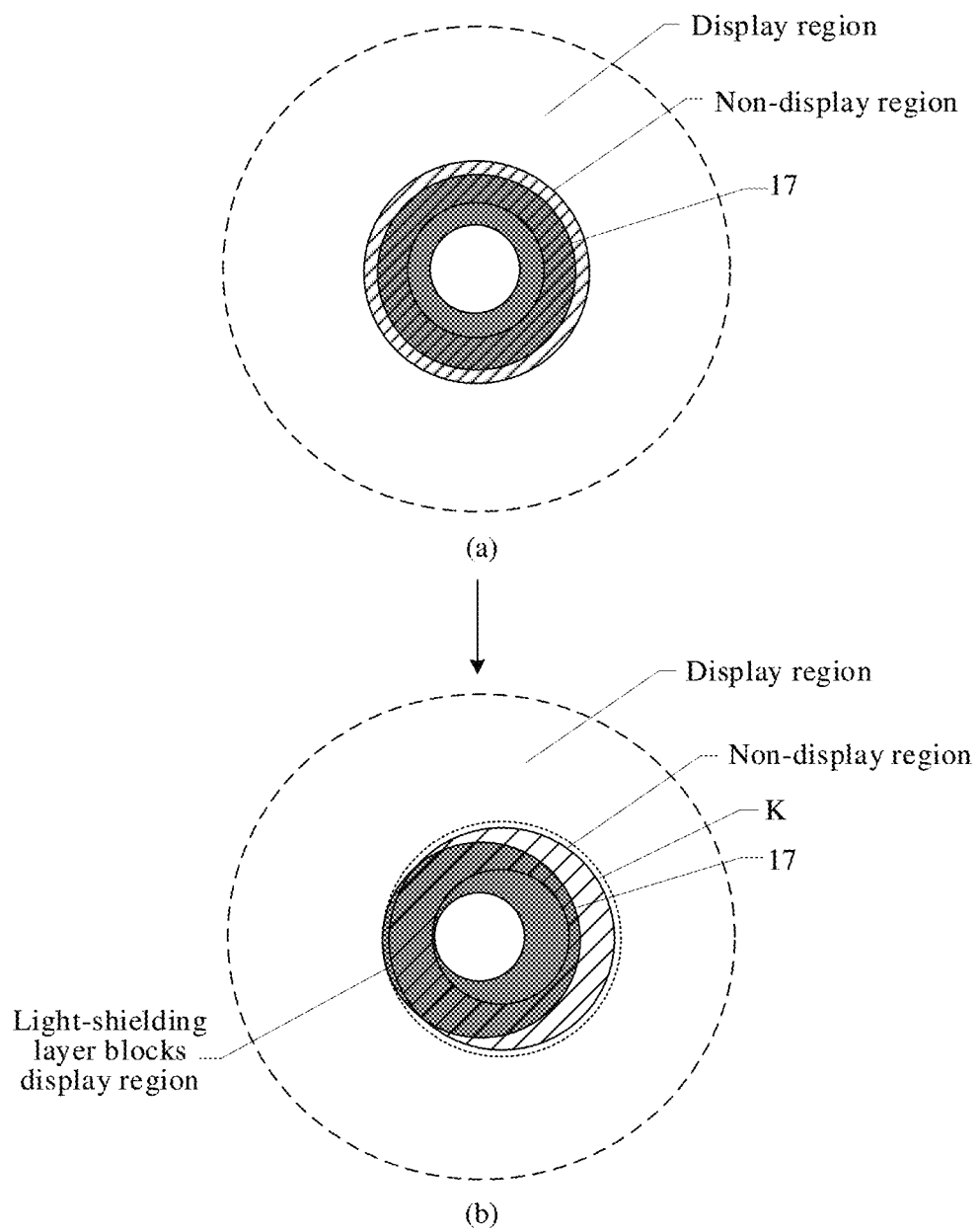
FIG. 13 is a partial schematic structural diagram of an electronic device with a foldable screen changing from a first state to a second state according to some embodiments of this application, where (a) in FIG. 13 is a partial schematic structural diagram of the electronic device with the foldable screen in the first state; and (b) in FIG. 13 is a partial schematic structural diagram of the electronic device with the foldable screen in the second state.
Figure 14:
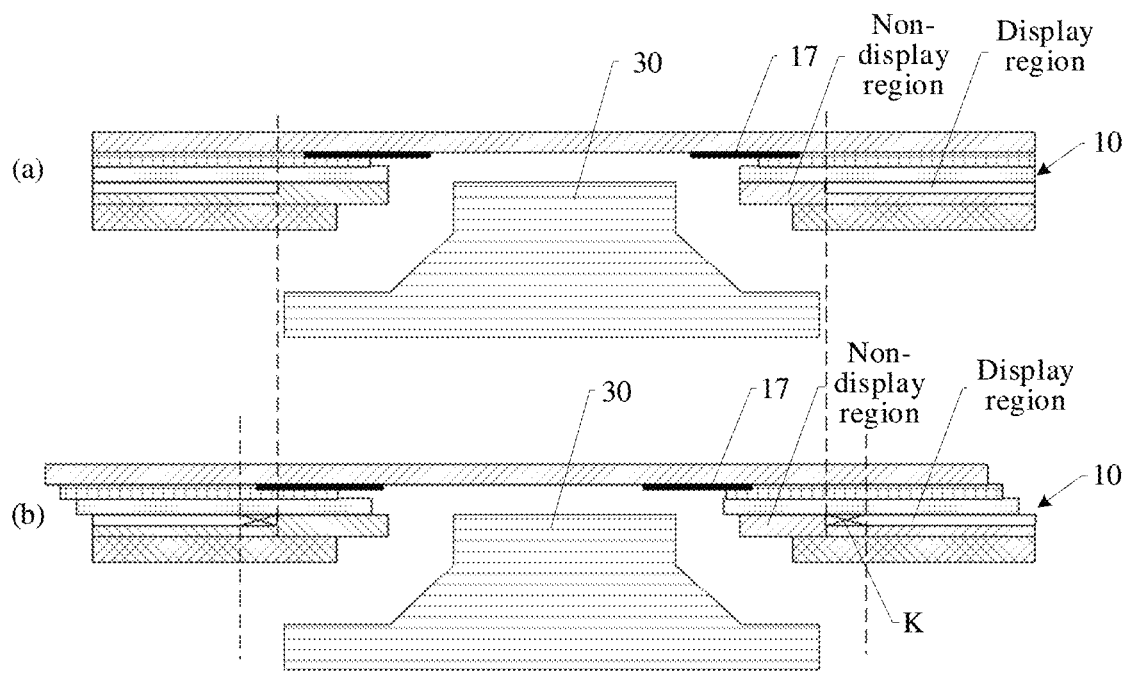
FIG. 14 is a schematic structural cross-sectional view of the electronic device shown in FIG. 13, where (a) in FIG. 14 is a schematic structural cross-sectional view of the electronic device shown in (a) in FIG. 13; and (b) in FIG. 14 is a schematic structural cross-sectional view of the electronic device shown in (b) in FIG. 13.

To prevent the light-shielding layer 17 from blocking the display content and increase the screen-to-body ratio of the foldable screen 10, refer to FIG. 13 and FIG. 14. FIG. 13 is a partial schematic structural diagram of an electronic device 100 with a foldable screen 10 changing from a first state to a second state according to some embodiments of this application. FIG. 14 is a schematic structural cross-sectional view of the electronic device 100 shown in FIG. 13.

Specifically, (a) in FIG. 13 is a partial schematic structural diagram of the electronic device 100 with the foldable screen 10 in the first state; and (b) in FIG. 13 is a partial schematic structural diagram of the electronic device 100 with the foldable screen 10 in the second state. (a) in FIG. 14 is a schematic structural cross-sectional view of the electronic device 100 shown in (a) in FIG. 13; and (b) in FIG. 14 is a schematic structural cross-sectional view of the electronic device 100 shown in (b) in FIG. 13.

Referring to (a) in FIG. 13 and (a) in FIG. 14, when the foldable screen 10 is in the first state, the orthographic projection of the light-shielding layer 17 on the display panel 12 overlaps with the non-display region, and does not overlap with the display region. In other words, the light-shielding layer 17 only blocks the non-display region and does not block the display region, and a size of the outer edge of the light-shielding layer 17 is smaller than a size of the outer edge of the non-display region. When the foldable screen 10 is in the first state, a center of the light-shielding layer 17 may or may not be aligned with a center of the non-display region.

Figure 15:
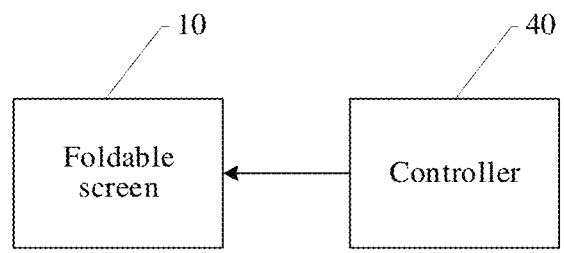
FIG. 15 is a block diagram of an internal circuit of the electronic device shown in FIG. 13 and FIG. 14.

Referring to (b) in FIG. 13 and (b) in FIG. 14, when the foldable screen 10 is in the second state, because the non-display region and the light-shielding layer 17 are displaced, the orthographic projection of the light-shielding layer 17 on the display panel 12 may overlap with the display region. In other words, in this state, the light-shielding layer 17 may block the display region. In this state, to prevent the light-shielding layer 17 from affecting images displayed in the display region, refer to FIG. 15. FIG. 15 is a block diagram of an internal circuit of the electronic device shown in FIG. 13 and FIG. 14. The electronic device 100 further includes a controller 40. The controller 40 is located in the inner accommodating cavity of the electronic device 100. For example, the controller is located on a main board of the inner accommodating cavity of the electronic device 100. The controller 40 is electrically connected to the foldable screen 10. When the foldable screen 10 is in the second state, the controller 40 is configured to control a first part K in the display region adjacent to and surrounding the non-display region to be in a black screen state.

In the foregoing embodiments, it should be noted that, to enable the first part K to be in the black screen state, pixels in the first part K may be turned off through the controller 40, or gray values of the pixels in the first part K may be set to 0 through the controller 40, or the gray values are set to any value in a range greater than 0 (for example, [0, 128]), so that the first part K displays black or gray, which is not particularly limited herein.

In this way, when the foldable screen 10 is in the second state, the first part K is controlled to be in the black screen state through the controller 40, so that the area of an effective display region can be reduced, thereby preventing the light-shielding layer 17 from blocking the display content. When the foldable screen 10 is in the first state, images and videos may be displayed normally through the first part K, to ensure the screen-to-body ratio of the foldable screen 10 in the first state.

Specifically, to ensure the screen-to-body ratio of the foldable screen 10 in the first state, the outer edge of the light-shielding layer 17 and the outer edge of the non-display region are both circular edges, and a difference between a diameter of the outer edge of the non-display region and a diameter of the outer edge of the light-shielding layer 17 is less than or equal to 0.9 mm. In other words, when the center of the light-shielding layer 17 is aligned with the center of the non-display region, a one-sided gap between the outer edge of the light-shielding layer 17 and the outer edge of the non-display region is less than or equal to 0.45 mm. However, in the prior art, the one-sided gap E is usually greater than 0.45 mm. Therefore, with a specific diameter of the outer edge of the light-shielding layer 17, the diameter of the outer edge of the non-display region is reduced, thereby increasing the area of the display region and increasing the screen-to-body ratio.

Further optionally, the difference between the diameter of the outer edge of the non-display region and the diameter of the outer edge of the light-shielding layer 17 is greater than or equal to 0.2 mm and less than or equal to 0.8 mm. In this way, the screen-to-body ratio of the foldable screen 10 can be further increased. In addition, when the center of the light-shielding layer 17 is aligned with the center of the non-display region, a gap between the outer edge of the non-display region and the outer edge of the light-shielding layer 17 is moderate, thereby preventing the light-shielding layer 17 from blocking the display region to some extent when the foldable screen 10 is in the first state due to an assembly error during assembly.

In the embodiments shown in FIG. 13 and FIG. 14, the foldable screen 10 may be an inward foldable screen or an outward foldable screen. The first state is one of an unfolded state, a half-folded state, or a folded state of the foldable screen 10, and the second state is one of the unfolded state, the half-folded state, or the folded state of the foldable screen 10. The first state and the second state are two different states. An example in which the foldable screen 10 is foldable to form the first screen A and the second screen B is used. The first state is a state of the foldable screen 10 when the included angle α between the first screen A and the second screen B is a first included angle. The second state is a state of the foldable screen 10 when the included angle α between the first screen A and the second screen B is a second included angle. Angle values of the first included angle and the second included angle are different.

In some embodiments, the foldable screen 10 is an inward foldable screen, the first state is an unfolded state of the inward foldable screen, and the second state is a folded state of the inward foldable screen. For an electronic device 100 with an inward foldable screen, the use frequency of the foldable screen 10 in the unfolded state is relatively high. Therefore, the screen-to-body ratio of the foldable screen 10 in a commonly used state can be increased, thereby effectively improving user experience.

In some other embodiments, the foldable screen 10 is an outward foldable screen, the first state is a folded state of the outward foldable screen, and the second state is an unfolded state of the outward foldable screen. For an electronic device 100 with an outward foldable screen, the use frequency of the foldable screen 10 in the folded state is relatively high. Therefore, the screen-to-body ratio of the foldable screen 10 in the commonly used state can be increased, thereby effectively improving user experience.

In some other embodiments, the foldable screen 10 is an inward foldable screen or an outward foldable screen, the first state is a half-folded state, and the second state is a folded state or an unfolded state.

To determine the state of the foldable screen 10, a relative positional relationship among the light-shielding layer 17, the display region, and the non-display region can be determined by naked eyes. A relative position among the light-shielding layer 17, the display region, and the non-display region is affected by the included angle between the two screens into which the foldable screen is folded, and a correspondence between the relative position and the included angle is also determined after the structure of the electronic device 10 is determined. Therefore, to reduce the difficulty of determining the state of the foldable screen 10, the state of the foldable screen 10 can be determined by detecting the included angle between the two screens into which the foldable screen 10 is folded.

Figure 16:
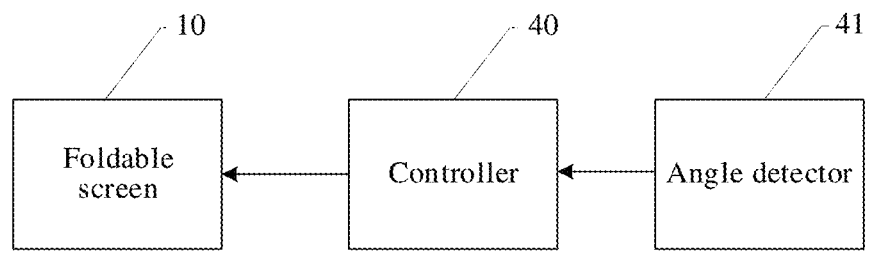
FIG. 16 is a block diagram of another internal circuit of the electronic device shown in FIG. 13 and FIG. 14.

Specifically, in some embodiments, an example in which the foldable screen 10 is foldable into a first screen A and a second screen B is used for description. FIG. 16 is a block diagram of another internal circuit of the electronic device shown in FIG. 13 and FIG. 14. The electronic device 100 further includes an angle detector 41.

The angle detector 41 is also a sensor. The angle detector 41 is configured to detect an included angle between the first screen A and the second screen B to obtain an included angle value. There are various structural forms of the angle detector 41. In some embodiments, the angle detector 41 is selected from at least one of a group including, but not limited to, a magnetic sensor, an acceleration sensor, a temperature/humidity sensor, an infrared sensor, a gyro sensor, and a position (for example, Global Positioning System (GPS)) sensor, but not limited thereto.

The angle detector 41 is electrically connected to the controller 40. The controller 40 is configured to determine the state of the foldable screen 10 according to the included angle value obtained by the angle detector 41, and further control the first part K in FIG. 13 and FIG. 14 to be or not to be in the black screen state according to the determined state of the foldable screen 10.

For example, when the foldable screen 10 is an inward foldable screen, the first state corresponds to an unfolded state of the inward foldable screen, and the second state corresponds to a folded state of the inward foldable screen. If the angle detector 41 detects that the included angle α between the first screen A and the second screen B is within the first preset range described above, the controller 40 determines that the foldable screen 10 is in the first state. If the angle detector 41 detects that the included angle α between the first screen A and the second screen B is within the third preset range described above, the controller 40 determines that the foldable screen 10 is in the second state. When it is determined that the foldable screen 10 is in the second state, the controller 40 controls the first part K in FIG. 13 and FIG. 14 to be in the black screen state. When it is determined that the foldable screen 10 is in the first state, the controller 40 controls the first part K in FIG. 13 and FIG. 14 to display normally.

In another example, when the foldable screen 10 is an outward foldable screen, the first state corresponds to a folded state of the outward foldable screen, and the second state corresponds to an unfolded state of the outward foldable screen. If the angle detector 41 detects that the included angle α between the first screen A and the second screen B is within the sixth preset range described above, the controller 40 determines that the foldable screen 10 is in the first state. If the angle detector 41 detects that the included angle α between the first screen A and the second screen B is within the fourth preset range described above, the controller 40 determines that the foldable screen 10 is in the second state. When it is determined that the foldable screen 10 is in the second state, the controller 40 controls the first part K in FIG. 13 and FIG. 14 to be in the black screen state. When it is determined that the foldable screen 10 is in the first state, the controller 40 controls the first part K in FIG. 13 and FIG. 14 to display normally.

To prevent the light-shielding layer 17 from blocking the display content of the display region when the foldable screen 10 is in other states except the first state and the second state, in some embodiments, the foldable screen 10 is foldable into a first screen A and a second screen B. An included angle between the first screen A and the second screen B is α. When the foldable screen 10 is in the first state, α=α1. When the foldable screen 10 is in the second state, α=α2. The first part K is annular, an inner diameter of the first part K is R1, and an outer diameter of the first part K is R2. When α=α1, r=R1, and when α=α2, r=R2.

When the foldable screen 10 changes from the first state to the second state, the controller 40 in FIG. 15 or FIG. 16 is further configured to control an annular region adjacent to and surrounding the non-display region to be in the black screen state. An inner diameter of the annular region is equal to R1, and there is a preset functional relationship between an outer diameter r of the annular region and α.

Figure 17:
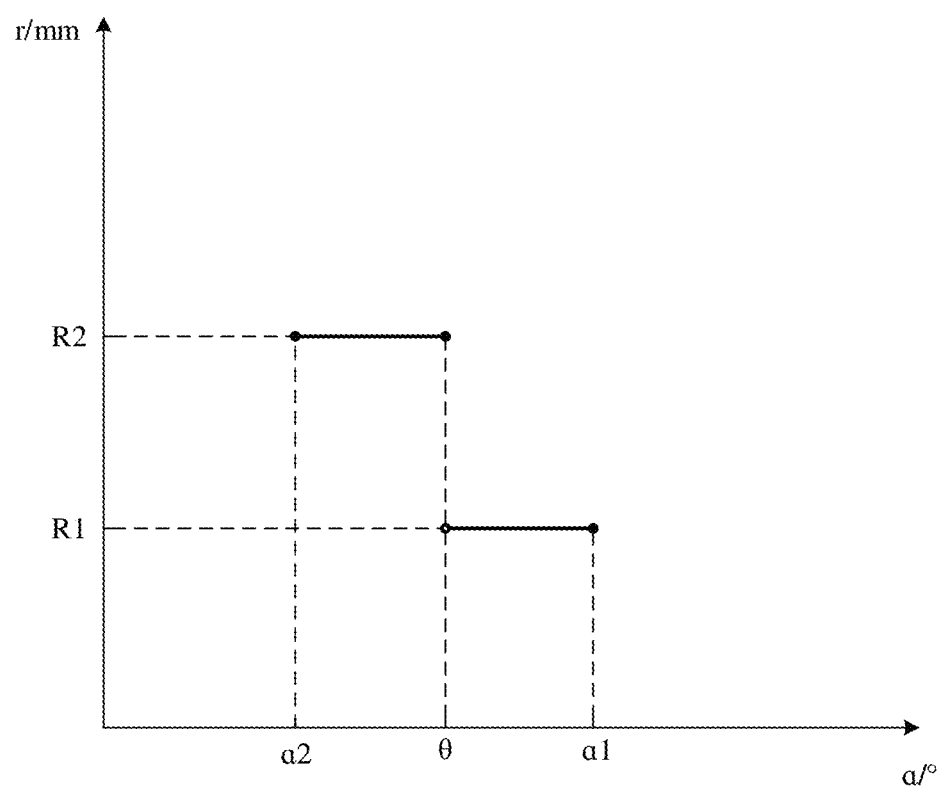
FIG. 17 is a graph of a functional relationship between r and a according to some embodiments of this application.

There are various preset functional relationships. In some embodiments, refer to FIG. 17. FIG. 17 is a graph of a functional relationship between r and a according to some embodiments of this application. In the embodiment shown in FIG. 17, when α∈[α1, θ), r=R1. When α∈[θ, α2], r=R2, where θ is a preset value between α1 and α2.

Figure 18:
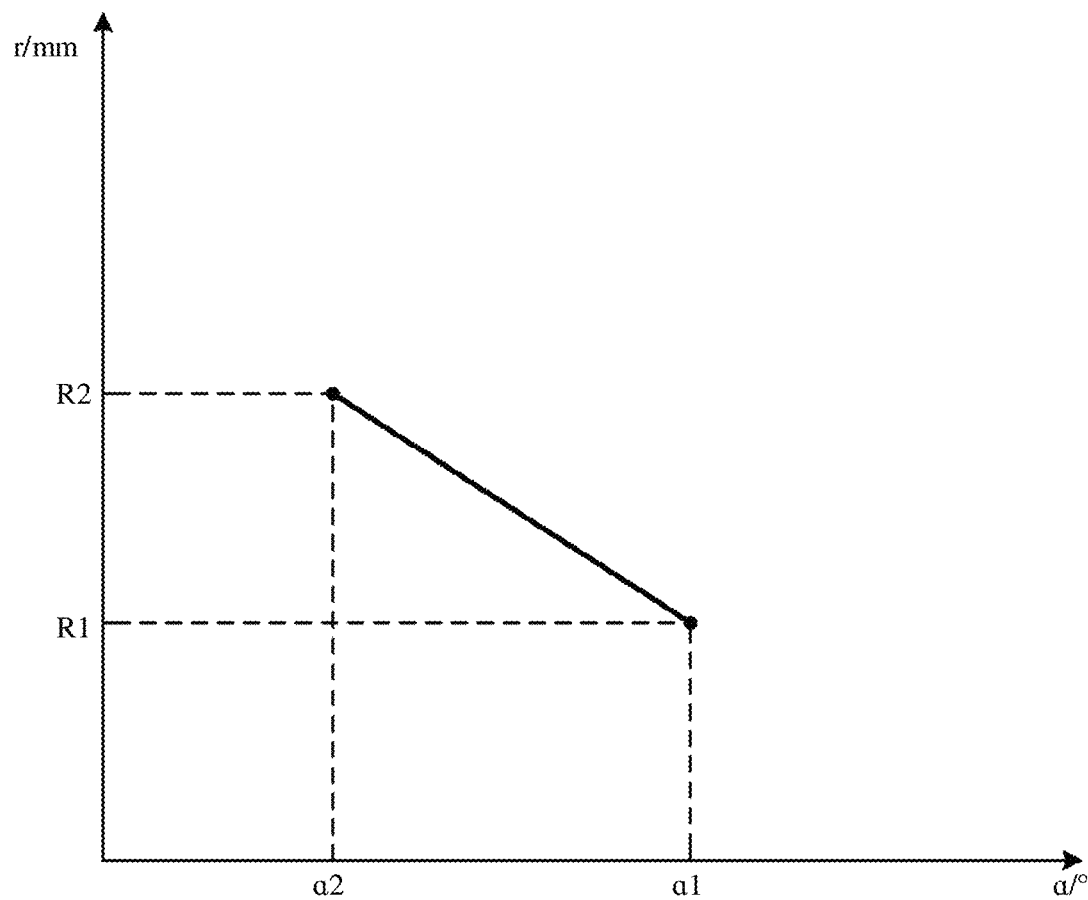
FIG. 18 is a graph of another functional relationship between r and a according to some embodiments of this application.

In another embodiment, refer to FIG. 18. FIG. 18 is a graph of another functional relationship between r and a according to some embodiments of this application. In the embodiment shown in FIG. 18, r=[(α-α1)/(α2-α1)]R2+ [(α2-α)/(α2-α1)]R1. In this way, when the foldable screen 10 changes from the first state to the second state, r gradually increases from R1 to R2.

In this way, the light-shielding layer 17 can be prevented from blocking the display content of the display region when the foldable screen 10 is in other states except the first state and the second state.

Figure 19:
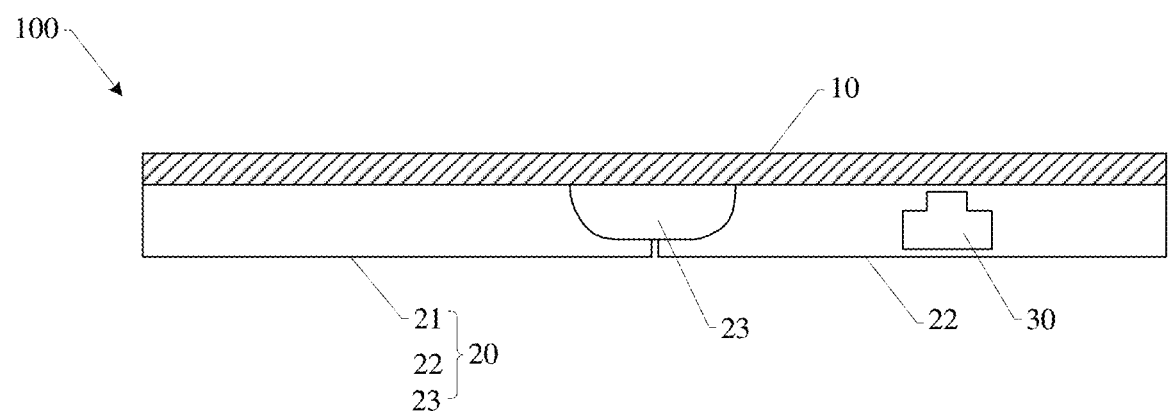
FIG. 19 is a side view of the electronic device shown in FIG. 1.

The housing 20 is configured to support the foldable screen 10 and allow the foldable screen 10 to be folded. FIG. 19 is a side view of the electronic device shown in FIG. 1. In this embodiment, the housing 20 includes a first housing 21, a second housing 22, and a rotating shaft 23. The first housing 21 and the second housing 22 are rotatably connected together by the rotating shaft 23. The first screen A of the foldable screen 10 is fixed and supported on the first housing 21, the second screen B of the foldable screen 10 is fixed and supported on the second housing 22, and a region in which the folding shaft of the foldable screen 10 is located is fixed and supported on the rotating shaft 23. In this way, the folding or unfolding of the foldable screen 10 can be achieved by turning over the housing 20.

Some embodiments of this application further provide a control method for an electronic device 100, and the electronic device 100 includes a foldable screen 10. The foldable screen 10 includes a light-transmitting cover plate 11 and a display panel 12 that are stacked. The display panel 12 includes a display region and a non-display region surrounded by the display region. The display region may surround the entire non-display region, or surround three sides, two sides, or one side of the non-display region in a circumferential direction. In this application, an example in which the display region surrounds the entire non-display region only is used for description. This cannot be considered as a special limitation to this application. A light-shielding layer 17 is arranged between the light-transmitting cover plate 11 and the display panel 12. Optionally, the light-shielding layer 17 is arranged on a surface of the light-transmitting cover plate 11 facing the display panel 12.

Figure 20:
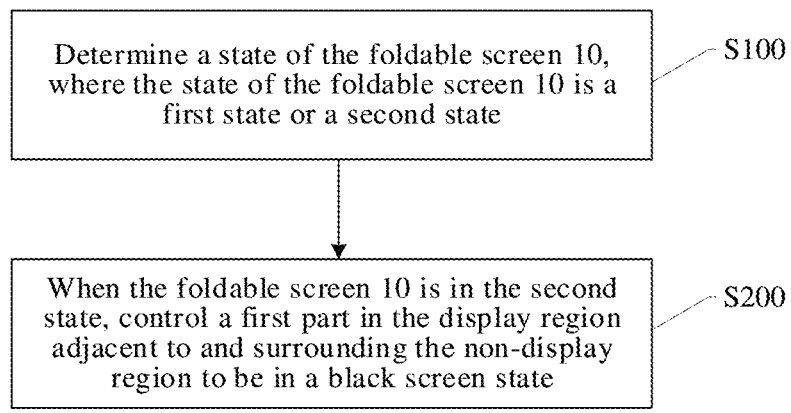
FIG. 20 is a flowchart of a control method for an electronic device according to some embodiments of this application.

FIG. 20 is a flowchart of a control method for an electronic device 100 according to some embodiments of this application. Specifically, the control method includes:

S100: Determine a state of the foldable screen 10, where the state of the foldable screen 10 is a first state or a second state, and when the foldable screen 10 is in the first state, an orthographic projection of the light-shielding layer 17 on the display panel 12 overlaps with the non-display region and does not overlap with the display region.

S200: When the foldable screen 10 is in the second state, control a first part in the display region adjacent to and surrounding the non-display region to be in a black screen state.

To enable the first part K to be in the black screen state, pixels in the first part K may be turned off, or gray values of the pixels in the first part K may be set to 0, or the gray values are set to any value in a range greater than 0 (for example, [0, 128]), so that the first part K displays black or gray, which is not particularly limited herein.

In this way, when the foldable screen 10 is in the second state, the first part K is controlled to be in the black screen state, so that the area of an effective display region can be reduced, thereby preventing the light-shielding layer 17 from blocking the display content. When the foldable screen 10 is in the first state, the first part K may be controlled to display images and videos normally, to ensure the screen-to-body ratio of the foldable screen 10 in the first state.

In the foregoing embodiments, the foldable screen 10 may be an inward foldable screen or an outward foldable screen. The first state is one of an unfolded state, a half-folded state, or a folded state of the foldable screen 10, and the second state is one of the unfolded state, the half-folded state, or the folded state of the foldable screen 10. The first state and the second state are two different states. An example in which the foldable screen 10 is foldable to form the first screen A and the second screen B is used. The first state is a state of the foldable screen 10 when the included angle α between the first screen A and the second screen B is a first included angle. The second state is a state of the foldable screen 10 when the included angle α between the first screen A and the second screen B is a second included angle. Angle values of the first included angle and the second included angle are different.

In some embodiments, the foldable screen 10 is an inward foldable screen, the first state is an unfolded state of the inward foldable screen, and the second state is a folded state of the inward foldable screen. For an electronic device 100 with an inward foldable screen, the use frequency of the foldable screen 10 in the unfolded state is relatively high. Therefore, the screen-to-body ratio of the foldable screen 10 in a commonly used state can be increased, thereby effectively improving user experience.

In some other embodiments, the foldable screen 10 is an outward foldable screen, the first state is a folded state of the outward foldable screen, and the second state is an unfolded state of the outward foldable screen. For an electronic device 100 with an outward foldable screen, the use frequency of the foldable screen 10 in the folded state is relatively high. Therefore, the screen-to-body ratio of the foldable screen 10 in the commonly used state can be increased, thereby effectively improving user experience.

In some other embodiments, the foldable screen 10 is an inward foldable screen or an outward foldable screen, the first state is a half-folded state, and the second state is a folded state or an unfolded state.

To determine the state of the foldable screen 10, a relative positional relationship among the light-shielding layer 17, the display region, and the non-display region can be determined by naked eyes. A relative position among the light-shielding layer 17, the display region, and the non-display region is affected by the included angle between the two screens into which the foldable screen is folded, and a correspondence between the relative position and the included angle is also determined after the structure of the electronic device 10 is determined. Therefore, to reduce the difficulty of determining the state of the foldable screen 10, the state of the foldable screen 10 can be determined by detecting the included angle between the two screens into which the foldable screen 10 is folded.

Figure 21:
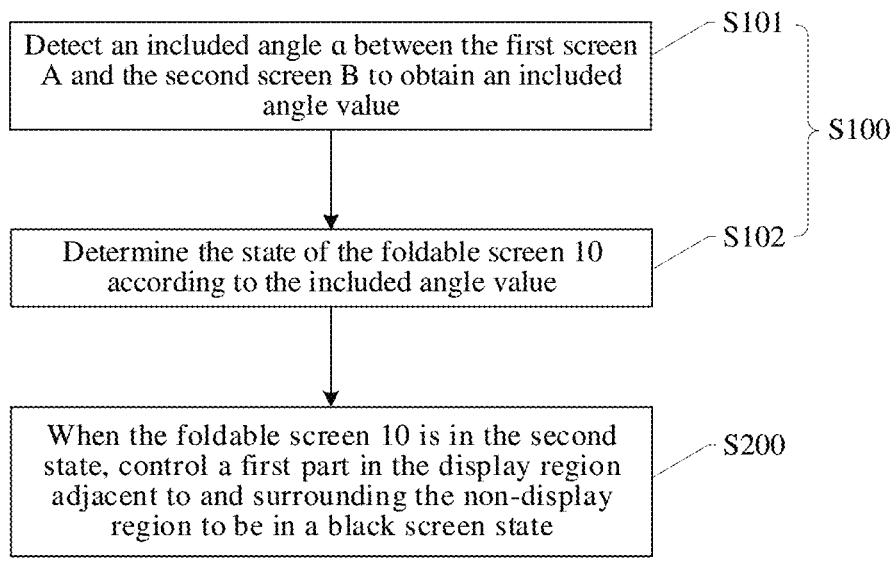
FIG. 21 is a flowchart of a control method for an electronic device according to some other embodiments of this application.

Specifically, in some embodiments, refer to FIG. 21. FIG. 21 is a flowchart of a control method for an electronic device 100 according to some other embodiments of this application. In this embodiment, an example in which the foldable screen 10 is foldable into a first screen A and a second screen B is used for description. Step S100 includes: S101: Detect an included angle $\alpha$ between the first screen A and the second screen B to obtain an included angle value. S102: Determine the state of the foldable screen 10 according to the included angle value.

For example, when the foldable screen 10 is an inward foldable screen, the first state corresponds to an unfolded state of the inward foldable screen, and the second state corresponds to a folded state of the inward foldable screen. If it is detected that the included angle $\alpha$ between the first screen A and the second screen B is within the first preset range described above, it is determined that the foldable screen 10 is in the first state. If it is detected that the included angle $\alpha$ between the first screen A and the second screen B is within the third preset range described above, it is determined that the foldable screen 10 is in the second state. When it is determined that the foldable screen 10 is in the second state, the first part K is controlled to be in the black screen state. When it is determined that the foldable screen 10 is in the first state, the first part K is controlled to display normally.

In another example, when the foldable screen 10 is an outward foldable screen, the first state corresponds to a folded state of the outward foldable screen, and the second state corresponds to an unfolded state of the outward foldable screen. If it is detected that the included angle $\alpha$ between the first screen A and the second screen B is within the sixth preset range described above, it is determined that the foldable screen 10 is in the first state. If it is detected that the included angle $\alpha$ between the first screen A and the second screen B is within the fourth preset range described above, it is determined that the foldable screen 10 is in the second state. When it is determined that the foldable screen 10 is in the second state, the first part K is controlled to be in the black screen state. When it is determined that the foldable screen 10 is in the first state, the first part K is controlled to display normally.

To prevent the light-shielding layer 17 from blocking the display content of the display region when the foldable screen 10 is in other states except the first state and the second state, in some embodiments, the foldable screen 10 is foldable into a first screen A and a second screen B. An included angle between the first screen A and the second screen B is $\alpha$. When the foldable screen 10 is in the first state, $\alpha=\alpha1$. When the foldable screen 10 is in the second state, $\alpha=\alpha2$. The first part K is annular, an inner diameter of the first part K is R1, and an outer diameter of the first part K is R2. When $\alpha=\alpha1$, r=R1, and when $\alpha=\alpha2$, r=R2. The control method for the electronic device 100 further includes:

when the foldable screen 10 changes from the first state to the second state, controlling an annular region adjacent to and surrounding the non-display region to be in the black screen state. An inner diameter of the annular region is equal to R1, and there is a preset functional relationship between an outer diameter r of the annular region and $\alpha$.

There are various preset functional relationships. In some embodiments, when $\alpha\in[\alpha1, \theta)$, r=R1; and when $\alpha\in[\theta, \alpha2]$, r=R2, where $\theta$ is a preset value between $\alpha1$ and $\alpha2$.

In another embodiment, $r=[(\alpha-\alpha1)/(\alpha2-\alpha1)]R2+[(\alpha2-\alpha)/(\alpha2-\alpha1)]R1$. In this way, when the foldable screen 10 changes from the first state to the second state, r gradually increases from R1 to R2.

In this way, the light-shielding layer 17 can be prevented from blocking the display content of the display region when the foldable screen 10 is in other states except the first state and the second state.

Some embodiments of this application further provide a computer storage medium. The computer storage medium includes but is not limited to any medium that can store program code, such as a USB flash drive, a removable hard disk, a read-only memory (read-only memory, ROM), a random access memory (random access memory, RAM), a magnetic disk, or an optical disc. The computer storage medium includes computer instructions. The computer instructions, when run on the electronic device 100, cause the electronic device 100, to perform the control method according to any of the foregoing embodiments.

Some embodiments of this application further provide a computer program product. The computer program product, when run on a computer, causes the computer to perform the control method according to any of the foregoing embodiments.

The computer storage medium or the computer program product provided in the embodiments of this application is configured to perform the control method according to any of the foregoing embodiments. Therefore, for beneficial effects that can be achieved, refer to the beneficial effects of the corresponding control method described above. Details are not described herein again.

In the descriptions of this specification, the specific features, structures, materials, or characteristics may be combined in a proper manner in any one or more of the embodiments or examples.

Finally, it should be noted that the foregoing embodiments are merely used for describing the technical solutions of this application, but are not intended to limit this application. Although this application is described in detail with reference to the foregoing embodiments, a person of ordinary skill in the art should understand that modifications can be made to the technical solutions described in the foregoing embodiments, or equivalent replacements can be made to some technical features thereof without departing from the spirit and scope of the technical solutions of the embodiments of this application.

What is claimed is:

1. An electronic device comprising:
   a foldable screen; and
   a controller;
   wherein the foldable screen comprises a light-transmitting cover plate and a display panel, the light-transmitting cover plate and the display panel are stacked, the display panel comprises a display region and a non-display region surrounded by the display region, and a light-shielding layer is arranged between the light-transmitting cover plate and the display panel;
   wherein the controller is electrically connected to the foldable screen;
   wherein the foldable screen is foldable between a first state and a second state; and
   wherein when the foldable screen is in the first state, an orthographic projection of the light-shielding layer on the display panel overlaps with the non-display region and does not overlap with the display region, and when the foldable screen is in the second state, the controller is configured to control a first part in the display region adjacent to and surrounding the non-display region to be in a black screen state.

2. The electronic device according to claim 1, wherein an outer edge of the non-display region and an outer edge of the light-shielding layer are circular edges, and a difference between a diameter of the outer edge of the non-display region and a diameter of the outer edge of the light-shielding layer is less than or equal to 0.9 mm.

3. The electronic device according to claim 2, wherein the difference between the diameter of the outer edge of the non-display region and the diameter of the outer edge of the light-shielding layer is greater than or equal to 0.2 mm and less than or equal to 0.8 mm.

4. The electronic device according to claim 1, wherein the foldable screen is an inward foldable screen, and wherein the first state is an unfolded state, and the second state is a folded state.

5. The electronic device according to claim 1, wherein the foldable screen is an outward foldable screen, and wherein the first state is a folded state, and the second state is an unfolded state.

6. The electronic device according to claim 1, wherein the foldable screen is foldable into a first screen and a second screen;
wherein the electronic device further comprises an angle detector, and the angle detector is electrically connected to the controller;
wherein the angle detector is configured to detect an included angle between the first screen and the second screen to obtain an included angle value; and
wherein the controller is configured to determine a state of the foldable screen according to the included angle value, and control the first part to be or not to be in the black screen state according to the state of the foldable screen.

7. The electronic device according to claim 1, wherein the foldable screen is foldable into a first screen and a second screen;
wherein the included angle between the first screen and the second screen is $\alpha$; when the foldable screen is in the first state, $\alpha=\alpha1$; when the foldable screen is in the second state, $\alpha=\alpha2$; the first part is annular, an inner diameter of the first part is R1, and an outer diameter of the first part is R2; when $\alpha=\alpha1$, r=R1, and when $\alpha=\alpha2$, r=R2; and
wherein when the foldable screen changes from the first state to the second state, the controller is further configured to control an annular region adjacent to and surrounding the non-display region to be in the black screen state, an inner diameter of the annular region is equal to R1, and there is a preset functional relationship between an outer diameter r of the annular region and $\alpha$.

8. The electronic device according to claim 7, wherein the preset functional relationship is:

when $\alpha \in [\alpha1, \theta), r=R1$; and when $\alpha \in [\theta, \alpha2], r=R2$, wherein $\theta$ is a preset value between $\alpha1$ and $\alpha2$.

9. The electronic device according to claim 7, wherein the preset functional relationship is:

$r=[(\alpha-\alpha1)/(\alpha2-\alpha1)]R2+[(\alpha2-\alpha)/(\alpha2-\alpha1)]R1$.

10. The electronic device according to claim 1, wherein a first opening is provided in the non-display region, and a second opening is provided in the light-shielding layer; and
wherein the electronic device further comprises a camera module, the camera module is located at a side of the display panel away from the light-transmitting cover plate, a light incident end of the camera module is located in the first opening, and a light incident surface of the camera module faces a region opposite to the second opening on the light-transmitting cover plate.

11. A control method for an electronic device, wherein the electronic device comprises a foldable screen, wherein the foldable screen comprises a light-transmitting cover plate and a display panel that are stacked, wherein the display panel comprises a display region and a non-display region surrounded by the display region, and a light-shielding layer is arranged between the light-transmitting cover plate and the display panel, and the control method comprises:
determining a state of the foldable screen, wherein the state of the foldable screen is a first state or a second state, and when the foldable screen is in the first state, an orthographic projection of the light-shielding layer on the display panel overlaps with the non-display region and does not overlap with the display region, and
when the foldable screen is in the second state, controlling a first part in the display region adjacent to and surrounding the non-display region to be in a black screen state.

12. The control method according to claim 11, wherein the foldable screen is an inward foldable screen, and the first state is an unfolded state, and the second state is a folded state.

13. The control method according to claim 11, wherein the foldable screen is an outward foldable screen, and the first state is a folded state, and the second state is an unfolded state.

14. The control method according to claim 11, wherein the foldable screen is foldable into a first screen and a second screen, and determining the state of the foldable screen comprises:
detecting an included angle between the first screen and the second screen to obtain an included angle value; and
determining the state of the foldable screen according to the included angle value.

15. The control method according to claim 11, wherein the foldable screen is foldable into a first screen and a second screen, the included angle between the first screen and the second screen is $\alpha$, and when the foldable screen is in the first state, $\alpha=\alpha1$; when the foldable screen is in the second state, $\alpha=\alpha2$; the first part is annular, an inner diameter of the first part is R1, and an outer diameter of the first part is R2; when $\alpha=\alpha1$, r=R1, and when $\alpha=\alpha2$, r=R2; and the control method further comprises:
when the foldable screen changes from the first state to the second state, controlling an annular region adjacent to and surrounding the non-display region to be in the black screen state, wherein an inner diameter of the annular region is equal to R1, and there is a preset functional relationship between an outer diameter r of the annular region and $\alpha$.

16. The control method according to claim 15, wherein the preset functional relationship is:

when $\alpha \in [\alpha1, \theta), r=R1$; and when $\alpha \in [\theta, \alpha2], r=R2$, wherein $\theta$ is a preset value between $\alpha1$ and $\alpha2$.

17. The control method according to claim 15, wherein the preset functional relationship is:

$$r=[(\alpha-\alpha 1)/(\alpha 2-\alpha 1)]R2+[(\alpha 2-\alpha)/(\alpha 2-\alpha 1)]R1.$$

18. An electronic device comprising a foldable screen;
wherein the foldable screen comprises a light-transmitting cover plate and a display panel; wherein the light-transmitting cover plate and the display panel are stacked, the display panel comprises a display region and a non-display region surrounded by the display region, and a light-shielding layer is arranged between the light-transmitting cover plate and the display panel;
wherein the foldable screen is foldable between a first state and a second state; when the foldable screen is in the first state, an orthographic projection of the light-shielding layer on the display panel overlaps with the non-display region and does not overlap with the display region; when the foldable screen is in the second state, a first part in the display region adjacent to and surrounding the non-display region is in a black screen state.

19. The electronic device according to claim 18, wherein an outer edge of the non-display region and an outer edge of the light-shielding layer are circular edges, and a difference between a diameter of the outer edge of the non-display region and a diameter of the outer edge of the light-shielding layer is less than or equal to 0.9 mm.

20. The electronic device according to claim 19, wherein the difference between the diameter of the outer edge of the non-display region and the diameter of the outer edge of the light-shielding layer is greater than or equal to 0.2 mm and less than or equal to 0.8 mm.

\* \* \* \* \*